Dec. 12, 1950          E. F. NORELIUS          2,533,610

DRIVING AND STEERING MECHANISM FOR MOTOR VEHICLES

Filed Jan. 19, 1946          3 Sheets-Sheet 1

Inventor
Emil F. Norelius by W. Gerwig
Attorney

Inventor
Emil F. Norelius
by
Attorney

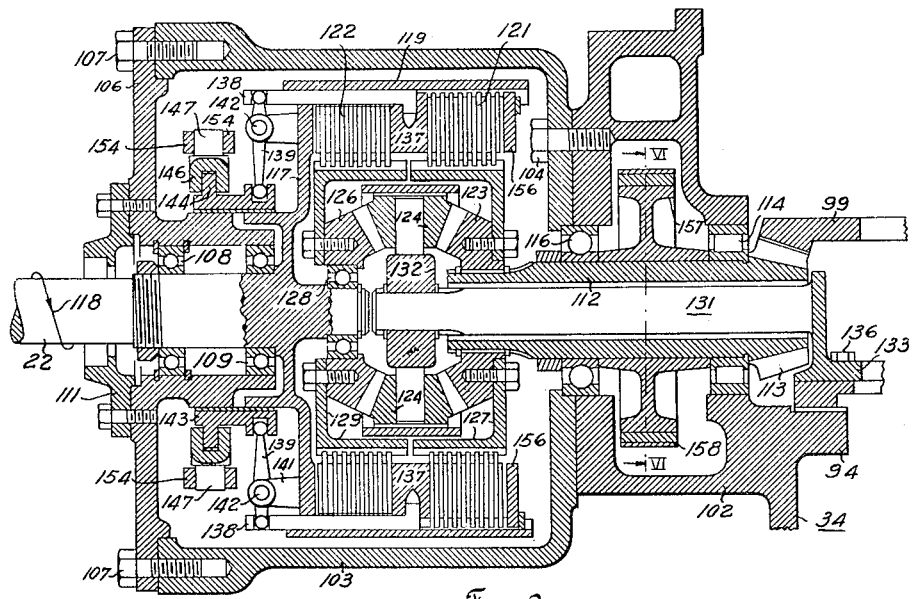
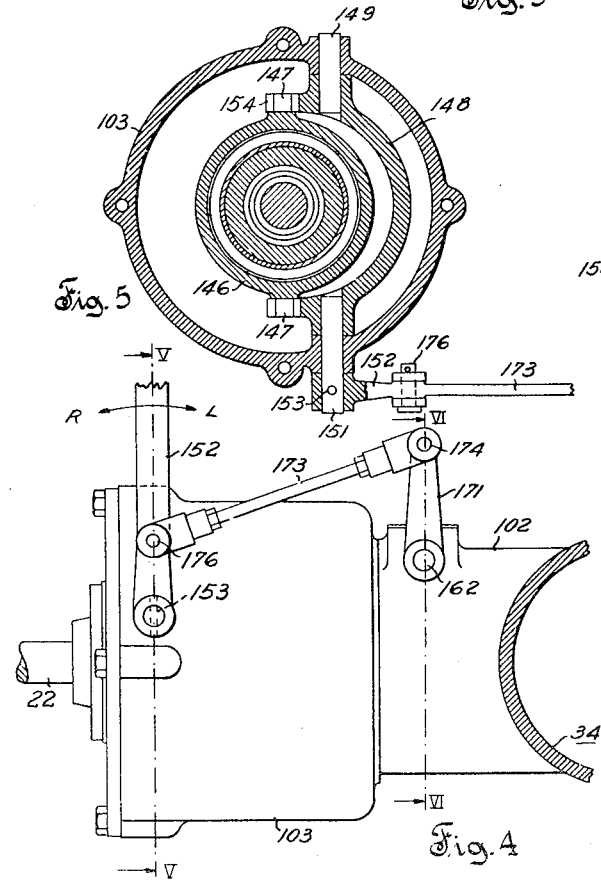
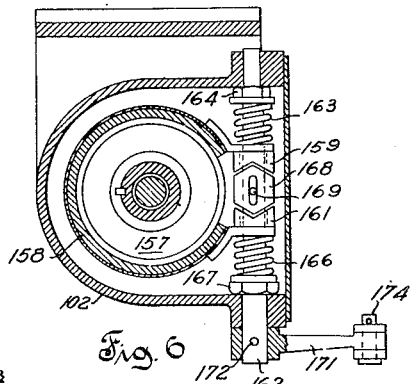
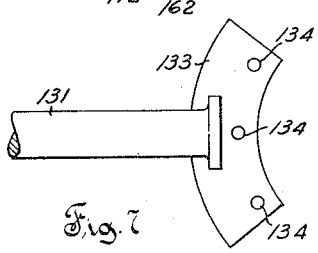

Patented Dec. 12, 1950

2,533,610

UNITED STATES PATENT OFFICE 2,533,610

DRIVING AND STEERING MECHANISM FOR MOTOR VEHICLES

Emil F. Norelius, Springfield, Ill., assignor to Allis-Chalmers Manufacturing Company, Milwaukee, Wis., a corporation of Delaware Application January 19, 1946, Serial No. 642,357

23 Claims. (Cl. 74—720.5)

The invention relates to motor vehicles and more particularly to motor vehicles of the type which are steered by driving, that is, in which steering is effected by controlling the drive of ground engaging traction devices at opposite sides of the vehicle.

In vehicles of the mentioned type, attempts have been made during the past to apply driving and steering power to the opposite traction devices by means of a mechanism which is known as a double differential, the principal elements of such a mechanism being a main differential between the traction devices for transmitting propelling power to the latter, and an auxiliary differential for transmitting steering power, separately from the propelling power, to relatively rotatable elements of the main differential, so as to impress a supplemental drive upon the compensating gearing of the main differential, which causes relative rotation of the half shafts of the latter and thereby produces the desired steering effect. Such attempts prior to this invention, however, have failed to produce a mechanically and commercially satisfactory solution of the problems involved, particularly in the matter of providing suitable gearing for transmitting the steering power separately from the propelling power to the compensating gearing of the main differential.

The propelling power, that is, the power required to overcome the forces opposing advance movement of the vehicle on a straight course, varies as to torque and speed within wide limits and it is subject to rise up to the full capacity of the vehicle motor, but the steering power, that is, the power required to overcome the forces opposing turning of the vehicle without advance movement, is substantially constant with respect to torque for a vehicle of any given construction, and the steering power required for turning at the usually required rates of angular velocity is much smaller than the full capacity of the engine. In a driving and steering mechanism which functions to transmit the steering power separately from the propelling power to relatively rotatable elements of a differential mechanism, it is therefore theoretically possible to design the drive for transmitting the steering power so that it will be of lighter construction than the drive for transmitting the propelling power. However, in actual practice it has been found difficult to realize a substantial advantage from this theoretical possibility by constructing the drive for transmitting the steering power considerably lighter than the drive for transmitting the propelling power.

The present invention contemplates the provision of a mechanically and commercially satisfactory motor vehicle in which steering is effected by superimposing a controlled drive upon the compensating gearing of a differential mechanism, and which avoids the shortcomings and inadequacies of the prior art with respect to the transmission of steering power separately from the propelling power to a differential mechanism between the traction devices.

The principal object of the invention is to provide an improved motor vehicle propelling and steering mechanism in which separate propelling power and steering power transmitting means are operatively connected with a differential mechanism, the improvement residing in an auxiliary planetary gear train and associated torque transmitting means, which are so arranged as to afford a relatively high reduction ratio of the steering power transmitting means and, consequently, permit a construction of the steering power transmitting means which is considerably lighter than that of the propelling power transmitting means.

A further object of the invention is to provide a mechanism of the hereinabove mentioned character, in which a propelling power transmitting differential and a steering power transmitting planetary gear train are operatively interconnected in a novel manner which enables the plentary gear train to serve as a speed reducing gearing between a rotatable steering power input element and two relatively rotatable elements of the propelling power transmitting differential.

A further object of the invention is to provide an improved interconnection between a propelling power transmitting differential mechanism and a steering power transmitting planetary gear train, as outlined hereinbefore, and in which the mentioned steering power input element will remain stationary, that is at zero speed, during straight course driving of the vehicle.

A further object of the invention is to provide an improved interconnecting mechanism between a propelling power transmitting differential and a steering power transmitting planetary gear train, which not only enables the planetary gear train to serve as a speed reducing gearing between a rotatable steering power input element and two relatively rotatable elements of the propelling power transmitting differential, but also affords an additional gear reduction between the planetary gear train and one of the mentioned elements of the differential.

A further object of the invention is to provide a propelling and steering mechanism incorporating an improved interconnection between a propelling power transmitting differential and a steering power transmitting planetary gear train as set forth hereinbefore, and which mechanism has a number of desirable operating characteristics in that it permits execution of a true pivot turn of the vehicle; turning of the vehicle at predetermined radii which are relatively short at slow speeds and relatively large at high speeds; execution of both pivot and radius turns substantially without waste of power; locking of the propelling power transmitting differential during straight course driving; and positive control of the movements of both traction elements of the vehicle during steering.

A further object of the invention is to provide in a propelling and steering mechanism of the above mentioned character, an improved mechanism for controlling transmission of power to the rotatable steering power input element selectively in opposite directions.

A still further object of the invention is to provide a propelling and steering mechanism of the above mentioned character which is relatively simple and compact, efficient and reliable in operation, which is not subject to undue wear, and which may be manufactured at relatively low costs.

In a vehicle propelling and steering mechanism as outlined hereinbefore, the main differential, the auxiliary planetary gear train and the associated torque transmitting means serve to drive the traction devices selectively in unison with each other or at differential speeds. The performance of this function in a novel and advantageous manner is one of the principal purposes of the invention, and in a broad sense the invention, therefore, is also concerned with and directed to an improved mechanism for driving a pair of relatively rotatable power transmitting elements selectively in unison or at differential speeds.

The foregoing and other objects and advantages of the invention will become more fully apparent from the following description of a preferred embodiment of the invention shown in the accompanying drawings. Referring to the drawings, in which like reference characters designate the same or similar parts in the several views:

Fig. 3 is an enlarged top view, in section, of a reversing clutch mechanism forming part of the steering mechanism shown in Fig. 2;

Fig. 4 is a side view of the reversing clutch mechanism shown in Fig. 3;

Fig. 5 is a section on line V—V of Fig. 4;

Fig. 6 is a section on line VI—VI of Figs. 3 and 4;

Fig. 7 is a detail view of a bracket appearing in Fig. 3;

Fig. 9 is a section on line IX—IX of Fig. 2;

Fig. 10 is a section on line X—X of Fig. 2; and

Figure 1:
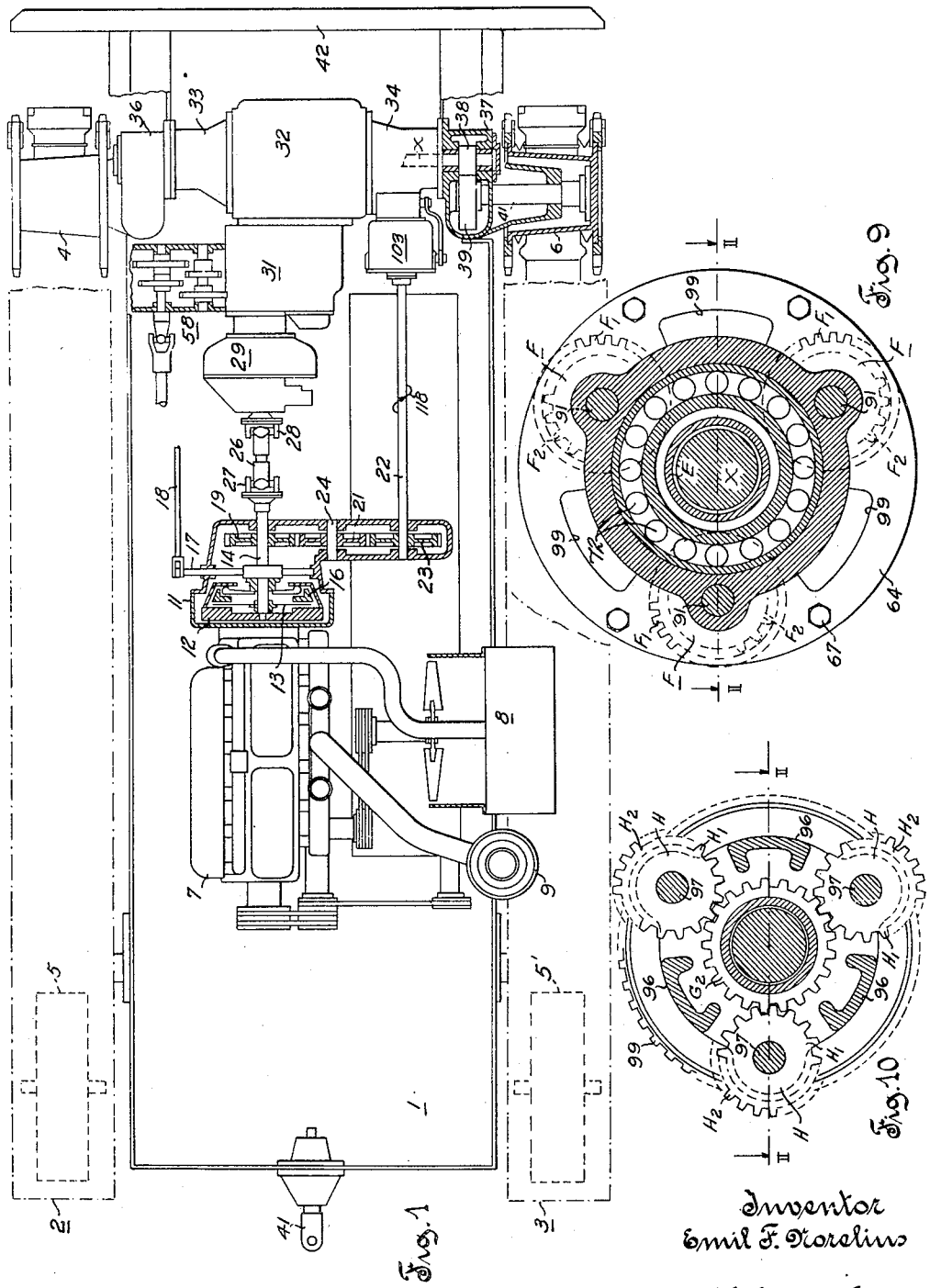
Fig. 1 is a top view, partly in section, of a crawler type tractor, showing the location and general arrangement of the improved driving and steering mechanism on the tractor.

The tractor shown in Fig. 1 is of the endless track type and comprises a main frame 1 and endless track mechanisms 2 and 3 at opposite sides, respectively, of the main frame. The endless track mechanisms are of identical and conventional construction, each comprising an endless track belt, load supporting rollers (not shown) mounted on the main frame and bearing upon the lower run of the track belt, a track belt supporting idler and a track belt drive sprocket. The drive sprockets for the track belts are designated in Fig. 1 by the reference characters 4 and 6, respectively, and are mounted, in the present instance, at the forward end of the tractor. Accordingly, the side of the tractor at which the track belt drive sprocket 4 is mounted will be referred to hereinbelow as the left side of the tractor, and the side of the tractor at which the track belt drive sprocket 6 is mounted will be referred to as the right side of the tractor, in conformity with the orientation of an operator positioned on the tractor and facing in the direction of forward travel. A rear idler for the left track belt is indicated in Fig. 1 at 5 and a rear idler for the right track belt is indicated at 5'.

Mounted on the main frame 1, intermediate the front and rear ends of the latter, are an internal combustion engine 7, a radiator 8, an air cleaner 9 and other conventional accessories for the engine, not shown. A master clutch housing 11 at the forward end of the engine 7 encloses a flywheel 12 which is secured to the crank shaft of the engine, a friction disk 13 secured to a driven clutch shaft 14, a thrust plate 16, and actuating mechanism for the clutch which is of conventional construction and comprises a transverse rock shaft 17 journaled in the housing 11 and projecting therefrom at the left side of the latter. Operating linkage for the master clutch is indicated at 18 and connected with the laterally projecting end of the rock shaft 17. The driven clutch shaft 14 is piloted at its rear end within the flywheel 12 and it is journaled intermediate its ends in the front wall of the clutch housing 11.

A power take-off mechanism for supplying steering power is connected in driven relation with the driven clutch shaft 14 and comprises a driving spur gear 19 keyed to the shaft 14 within the clutch housing 11, an intermediate gear 21 in constant mesh with the driving gear 19, a power take-off shaft 22, and a driven spur gear 23 keyed to the power take-off shaft 22 and in constant mesh with the intermediate gear 21. The power take-off shaft 22 and a supporting shaft 24 for the intermediate gear 21 are mounted in an extension of the clutch housing 11 at the right side of the latter, the clutch housing and its extension providing an enclosure for the power take-off gear train 19, 21, 23.

The forward end of the driven clutch shaft 14 is drivingly connected with an intermediate shaft 26 through a universal joint 27, and secured on the forward end of the intermediate shaft 26 is a universal joint 28 for drivingly connecting the intermediate shaft with the input shaft of a hydraulic torque converter mounted on the main frame 1 and generally indicated at 29. The torque converter conforms as to its construction and mode of operation with well-known principles and, therefore, requires no detailed explanation. Generally, the hydraulic torque converter is of the "Föttinger" type and comprises a pump rotor connected with the input shaft, a turbine rotor connected with the output shaft and a reactance element between the pump and turbine rotors. Its function is to convert the speed and torque at the driving shaft to that required by the driven shaft and the utility of hydraulic torque converters in automotive vehicles has long been recognized in the art. According to accepted practice in the automotive art, a mechanical change speed transmission is preferably provided, in addition to the torque converter, and in the tractor shown in Fig. 1 such additional change speed transmission is shown as being mounted in front of the torque converter 29, a housing enclosing the change speed transmission being designated by the reference character 31.

Figures 2, 8, 11:
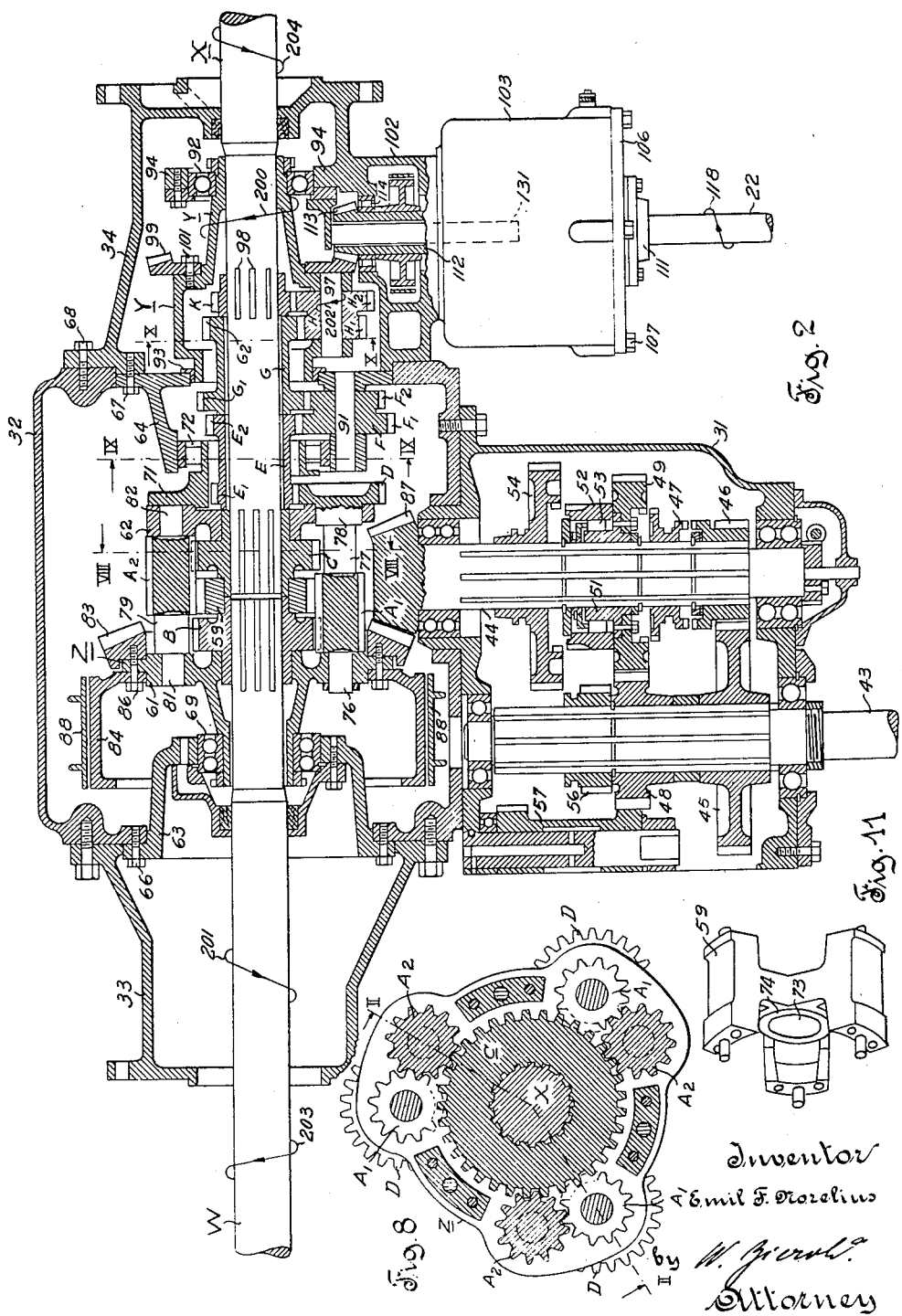
Fig. 2 is an enlarged top view, in section, of transmission, differential and steering mechanisms incorporated in the tractor shown in Fig. 1.
Fig. 8 is a section on line VIII—VIII of Fig. 2.
Fig. 11 is a perspective view of a spacer forming part of a differential mechanism appearing in Fig. 2.

The transmission housing 31 is connected at its forward end with a differential housing 32, and a left axle housing 33 and a right axle housing 34 are bolted, respectively, to opposite sides of the differential housing 32. Secured to the outer end of the left axle housing 33 is a final drive housing 36, and a similar final drive housing 37 which is an opposite hand duplicate of the final drive housing 36, is secured to the outer end of the right axle housing 34. The final drive housing 37 is shown in section in Fig. 1 to expose a pair of final drive gears 38 and 39, and a final drive shaft 41, which are mounted in the housing 37. The final drive shaft 41 is journaled at its inner end within the housing 37 and it extends axially thereof through an opening at the outer end of the housing in which opening the shaft is supported by a suitable bearing. The track belt drive sprocket 6 is bolted to a flange at the outer end of the final drive shaft 41, and the final drive gear 39 is mounted on and drivingly connected with the shaft 41 within the housing 37. The final drive gear 39 is in constant mesh with the final drive gear 38, and the latter gear is mounted on a shaft X which, as will appear hereinbelow, is connected with a differential mechanism within the housing 32 and forms one of the half shafts of the differential. As shown in Fig. 1, the half shaft X is journaled at its outer end in the final drive housing 37, and as shown in Fig. 2, the shaft X extends through the axle housing 34 into the differential housing 32. The other half shaft of the differential is designated in Fig. 2 by the reference character W and extends through the axle housing 33. The outer end of the half shaft W is drivingly connected with the track belt drive sprocket 4 in the same manner as has been explained hereinbefore in connection with the half shaft X and the track belt drive sprocket 6. That is, the track belt drive sprocket 4 is connected with the half shaft W through a pair of final drive gears (not shown) which are enclosed in the final drive housing 36 and correspond to the final drive gears 38, 39, and the half shaft W is journaled at its outer end in the final drive housing 36. The transmisison housing 31, the differential housing 32, the axle housings 33, 34 and the final drive housings 36, 37 are bolted together and mounted on the main frame 1 at the forward end of the latter in a suitable manner so as to securely maintain these housing parts in fixed position on the main frame. A drawbar 41 is mounted on the main frame at the rear end of the tractor, and a bumper bar 42 is mounted on the main frame at the forward end of the tractor. An operator's cab (not shown) is mounted on the main frame immediately behind the bumper 42 and over the housings 32, 33 and 34, suitable control levers for the master clutch, for the change speed transmission and for the steering mechanism which will be described hereinbelow, being provided within the cab.

Referring to Fig. 2, and more particularly to the change speed transmission which is shown in the left hand lower part of said figure, an input shaft 43 and an output shaft 44 of said transmission are journaled, as shown, in the housing 31. A suitable coupling, not shown, connects the input shaft 43 at its rear end in constantly driven relation with the output shaft of the hydraulic torque converter 29. A large diameter high speed gear 45 is splined in axially fixed position on the input shaft 43, and a small diameter high speed gear 46 in constant mesh with the gear 45 is loosely mounted in axially fixed position on the output shaft 44 for rotation independently of the latter. A clutch sleeve 47 is splined on the output shaft 44 for shifting movement axially of the latter, the sleeve 47 having rearward clutch teeth engageable with forward clutch teeth of the gear 46, and rearward shifting movement of the clutch sleeve 47 establishes a high speed driving connection between the input shaft 43 and the output shaft 44. Constantly meshing low speed gears 48 and 49 are mounted, respectively, on the driving and driven shafts, the low speed gear 48 being splined and axially fixed on the driving shaft 43, and the low speed gear 49 being loosely mounted in axially fixed position on the output shaft 44 for rotation independently of the latter. An overrunning clutch is interposed between the low speed gear 49 and the output shaft 44 and comprises a cam member 51 formed on the hub of the gear 49, a race member 52 surrounding the cam member, and a circumferential series of clutch rollers 53 between the cam member 51 and the race member 52. The race member 52 is selectively connectable with and disconnectable from the driven shaft 44 to establish and interrupt a driving connection between the race member of the overrunning clutch and the driven shaft. For this purpose a selector gear 54 is splined on the driven shaft 44 for shifting movement axially thereof, and external clutch teeth are formed on the race member 52 for cooperation with internal clutch teeth formed in a recess of the selector gear 54. Fig. 2 shows the selector gear 54 in a neutral position in which it is declutched from the race member 52, and from said neutral position the selector gear 54 may be shifted rearwardly into clutching engagement with the race member 52. The overrunning clutch comprising the cam member 51, race member 52 and rollers 53 affords a one-way driving connection between the driving and driven shafts 43, 44 upon clutching engagement of the selector gear 54 with the race member 52, and the cam surfaces of the cam member 52 are so arranged as to permit transmission of power from the driving to the driven shaft in a direction to cause forward movement of the tractor. A shift mechanism (not shown) for the clutch sleeve 47 and for the selector gear 54 is so arranged that the selector gear 54 may be moved into clutching engagement with the race member 52 preparatory to clutching engagement of the clutch sleeve 47 with the gear 46 and so that the clutch sleeve 47 may be declutched from the gear 46 while the selector gear 54 remains in clutching engagement with the race member 52. Accordingly, when the transmission is operated in high gear the race member 52 and the selector gear 54 will rotate in unison with the output shaft 44 and overrun the cam member 51 and the mobilized low speed gear 49; and in order to effect a change from high to low speed drive it is only necessary to declutch the sleeve 47 from the gear 46. In order to lock out the overrunning clutch 51, 52, 53, the clutch sleeve 47 may be moved forwardly from the neutral position in which it is shown in Fig. 2, into clutching engagement with the gear 49, relatively engageable external and internal clutch teeth being formed, as shown, on the forward part of the clutch sleeve 47, and in a recess of the gear 49, respectively. The mentioned shift mechanism for the clutch sleeve 47 and for the selector gear 54 is so arranged that the sleeve 47 may be clutched to the gear 49 while the selector gear 54 is in clutching engagement with the race member 52, and for normal operation of the transmission in low gear the clutch sleeve 47 is preferably clutched to the gear 49. A third speed gear 56 is splined on the driving shaft 43 for shifting movement axially thereof, and the gear 56 is meshable with the selector gear 54, while the latter is in its neutral position, in which it is shown in Fig. 2, to establish a driving connection between the driving and driven shafts for driving the tractor forwardly at a very low or creeper speed. A double pinion reverse idler 57 has a gear section in constant mesh with the low speed gear 48, and another gear section adapted to mesh with the selector gear 54 upon forward shifting movement of the latter from its neutral position.

Mounted at the left side of the transmission housing 31, as shown in Fig. 1, is another power take-off mechanism 58 which is geared to the input shaft 43 of the change speed transmission through the large diameter high speed gear 45. Auxiliary equipment, not shown, may be supplied with power from the vehicle motor 7 through the power take-off mechanism 58.

The torque converter 29 and the change speed transmission enclosed in the housing 31 are functionally related, in certain respects, with the hereinafter described mechanism for steering the tractor, as will be explained hereinbelow, and the foregoing detailed description of the change speed transmission is intended to clarify and facilitate a ready understanding of the functional interrelation between the change speed transmission and the steering mechanism. It should be understood, however, that other types of change speed transmissions which are well-known in the art may be used in lieu of the herein disclosed specific type of change speed transmission, and that the latter represents only an example of a change speed transmission affording three forward speeds and one reverse speed.

The invention contemplates, as has been set forth hereinabove, to provide a differential mechanism between the traction devices for transmitting propelling power to the latter, and to provide an auxiliary mechanism for superimposing a controlled drive upon the compensating gearing of the differential mechanism and thereby transmitting steering power to the traction devices. Fig. 2 shows a differential mechanism as contemplated by the invention, enclosed in the housing 32. For purposes of illustration a spur gear type differential mechanism has been selected, and generally this mechanism is constructed in conformity with well-known principles, but it includes provisions for superimposing the mentioned controlled drive upon its compensating gearing. The spider of the differential is generally designated by the reference character Z and comprises a central body part or spacer 59 (Fig. 11), a cover 61 at the left side of the spacer 59, and a cover 62 at the right side of the spacer.

The spacer 59 and the covers 61, 62 are bolted together, and the spider comprising these parts is mounted in the housing 32 for rotation about the axis of the aligned half shafts W and X. For that purpose a bearing carrier 63 is mounted in an aperture of the housing 32 at the left side of the latter, and another bearing carrier 64 is mounted within an aperture of the housing 32 at the right side of the latter. The bearing carrier 63 is secured in fixed position on the housing 32 by a circumferential series of bolts 66 which are screwed into the left side wall of the housing 32, and the bearing carrier 64 is secured in fixed position on the right axle housing 34 by a circumferential series of bolts 67 which are screwed into radial inwardly projecting lugs of the axle housing 34. A circumferential series of bolts 68 extend through a radial flange of the axle housing 34 and are screwed into the right side wall of the housing 32, and the axle housing 34 and the bearing carrier 64 are thus securely mounted on the housing 32. The left cover 61 of the spider Z has an axial sleeve portion surrounding the half-shaft W, and said sleeve portion is rotatably mounted in the bearing carrier 63 by means of a double row ball bearing 69. A hub 71 at the right side of the spider Z is bolted to the cover 62 and has a sleeve portion rotatably supported in the bearing carrier 64 by means of a roller bearing 72. The hub 71 is mounted on the cover 62 concentrically with the half shaft X, and the sleeve portion of the hub which extends into the roller bearing 72 is radially spaced a substantial distance from the outer surface of the shaft X to provide space for mounting a gear sleeve inside the hub 71, as shown in Fig. 2 and as will be explained more fully hereinbelow.

The compensating gearing of the differential mechanism comprises three sets of intermeshing pairs of planet pinions A₁ and A₂, best shown in Fig. 8, and sun gears B and C which are non-rotatably connected, respectively, with the differential half-shafts W and X. The sun gear B has a cylindrical hub extension rotatably mounted in a central bore of the cover 61, and the shaft W has external splines at its inner end matching internal splines of the sun gear B. Similarly, the sun gear C has a cylindrical hub extension rotatably mounted in a central bore of the cover 62, and the shaft X has external splines at its inner end and matching internal splines of the differential gear C. The spacer 59 has a central bore 73 (Fig. 11) accommodating relatively adjacent hub extensions of the gears B and C, and a radial annular thrust surface 74 is formed on the hub of the spacer 59 at the left side of the latter for cooperation with the gear B to limit axial displacement of the latter relative to the spider Z. Axial displacement of the gear C relative to the spider Z is similarly limited by an annular radial thrust surface on the hub of the spacer 59 at the right side of the latter.

Fig. 2 shows the differential mechanism in section on line II—II of Fig. 8, and it will be noted that the planet pinion A₁ shown in Fig. 2 meshes with the sun gear B and also with a planet pinion A₂ which does not appear in Fig. 2, but which is mounted on the spider in close proximity to the pinion A₁, as shown in Fig. 8. The planet pinion A₂ shown in Fig. 2 meshes with the sun gear C and it also meshes with a planet pinion A₁, which does not appear in Fig. 2, but which is mounted on the spider in close proximity to the pinion A₂, as shown in Fig. 8. In all, there are three planet pinions A₁, which are equally distributed about the gear B and are in constant mesh with the latter gear but do not mesh with the gear C, and there are three planet pinions $A_2$ which are equally distributed about the gear C and are in constant mesh with the latter gear but do not mesh with the gear B. The pinions $A_1$ extend axially beyond the gear B towards the gear C, and the pinions $A_2$ extend axially beyond the gear C towards the gear B, and the axially extending portions of adjacent pinions $A_1$ and $A_2$ are in constant mesh with each other.

The planet pinion $A_1$, as shown in Fig. 2, is formed in one piece with a journal 76 at the left side of the pinion, and with a shaft portion 77, a collar 78, and a spur gear D at the right side of the pinion. The journal 76 is rotatably fitted into a bore of the cover 61, and the collar 78 is rotatably fitted into a bore of the cover 62, to support the pinion $A_1$ and the gear D on the spider Z for rotation relative to the latter. The other two pinions $A_1$ which, as stated, are in mesh with the sun gear B, are each similarly formed in one piece with a journal, shaft portion, collar and spur gear D, and they are rotatably supported on the spider Z, as indicated in Fig. 8, and the foregoing explanations with respect to the showing of the pinion $A_1$ and gear D in Fig. 2, similarly apply to the other pinions $A_1$ and gears D which are shown in Fig. 8. The hub 71 by means of which the spider Z is rotatably mounted in the roller bearing 72, as explained hereinbefore, is suitably shaped to provide room for the gears D at the right side of the cover 62 so that the hub 71 will not interfere with rotation of the gears D relative to the spider.

The planet pinion $A_2$, as shown in Fig. 2, is formed in one piece with a shaft portion 79 and with a journal 81 at the left side of the pinion, and with a journal 82 at the right side of the pinion, the journals 81 and 82 being rotatably fitted into aligned bores of the covers 61 and 62 respectively, for rotatably supporting the pinion $A_2$ on the spider Z. The other two pinions $A_2$ which, as stated, are in mesh with the sun gear C are each similarly formed in one piece with opposite journals and a shaft portion, and they are rotatably supported on the spider Z, as indicated in Fig. 8, and the foregoing explanations with respect to the showing of the pinion $A_2$ in Fig. 2 similarly apply to the other pinions $A_2$ which are shown in Fig. 8.

As shown in Fig. 2, the cover 61 of the differential spider Z has an outer flange for mounting a bevel ring gear 83 and a brake drum 84 on the spider. The brake drum 84 has an inwardly projecting flange radially overlapping the flange on the cover 61 at the left side of the latter, and the ring gear 83 radially overlaps the flange on the cover 61 at the right side of the latter. A circumferential series of bolts 86 extend through aligned holes of the overlapping flanges of the ring gear and of the cover 61 and are screwed into the body part of the ring gear 83 for rigidly securing the brake drum 84, the ring gear 83 and the cover 61 together. The ring gear 83 meshes with a bevel pinion 87 of the output shaft 44 of the change speed transmission, the bevel pinion 87 being formed in one piece with the output shaft 44 at the forward end of the latter which projects into the diffierential housing 32. Peripherally arranged about the brake drum 84 are brake shoes 88 which are mounted within the housing 32 and are connected with a suitable mechanism (not shown) for moving the brake shoes into and out of frictional engagement with the outer surface of the brake drum 84. The mechanism for applying the brake shoes to the brake drum may be of conventional construction, and a control element for such mechanism is located in the cab which, as stated, is mounted on the forward part of the main frame, so that an operator may conveniently apply and release the brake, as desired. The brake drum 84 and the brake shoes 88 are amply proportioned to meet the requirements of a service brake for the tractor.

In connection with the description of Fig. 1, it has been stated hereinabove that power for steering the tractor is derived from the power take-off shaft 22, and in that connection further reference may now be had to Fig. 2, and more particularly to the steering gear mechanism which, as shown in said figure, comprises power transmitting gearing arranged about the right half shaft X of the differential, and a reversing clutch mechanism which is associated with the right axle housing 34. The purpose and general function of said power transmitting gearing and of the reversing clutch mechanism is to transmit power from the power take-off shaft 22 to the spur gears D which are associated, as stated, with the differential pinions $A_1$, or in other words, to superimpose a controlled drive upon the compensating gearing of the differential and to thereby produce the desired steering effect.

Referring to Fig. 2, a sleeve gear E surrounds a portion of the half shaft X in proximity to the differential spider Z at the right side of the latter, the sleeve gear E having an axial bore of somewhat larger diameter than the mentioned portion of the half shaft X, and the sleeve gear E is floatingly supported, as will appear hereinbelow, for rotation relative to the half shaft X about the axis of rotation of the spider Z. A gear section $E_1$ of the sleeve gear E, which is surrounded by the hub 71, meshes at points spaced 120 degrees apart with the three spur gears D, respectively, which are shown in Fig. 8 and which are rotatably mounted, as explained hereinabove, on the differential spider Z. The pitch diameter of the gear section $E_1$ is smaller than the pitch diameter of the spur gear D shown in Fig. 2, the other spur gears D shown in Fig. 8 each having the same pitch diameter as the spur gear D shown in Fig. 2. Tooth contact of the gear section $E_1$ with the three spur gears D floatingly supports the sleeve gear E at its inner end on the spider Z for rotation relative to and about the axis of the latter and relative to the half shaft X.

The sleeve gear E extends axially to the right beyond the sleeve portion of the hub 71 which is mounted in the roller bearing 72, and a gear section $E_2$ of larger pitch diameter than the gear section $E_1$ is formed on the sleeve gear E at the right end of the latter. The gear section $E_2$ meshes at points spaced 120 degrees apart with three double pinion idlers F which are mounted on the bearing carrier 64 as shown in Figs. 2 and 9. A base portion of the bearing carrier 64, which is secured to the axle housing 34 by bolts 67 as explained hereinabove, and an annular portion of the carrier 64 in which the roller bearing 72 is mounted, are spaced from each other axially of the shaft X; and, as shown in Fig. 9, the mentioned annular portion of the carrier 64 is supportingly connected with the base portion by three arms 99 which are spaced from each other circumferentially of the carrier to provide room for the idlers F. The carrier 64 is shown in section in Fig. 2 on line II—II of Fig. 9, and it will be seen that the idler F shown in Fig. 2 is rotatably mounted on a shaft 91 which is supported at its left end in the annular portion of the carrier 64, and at its right end in the base portion of said carrier. The other two idlers F, which are shown in Fig. 9, are similarly mounted on shafts 91, respectively, which extend between and are supported on the annular and base portions of the carrier 64.

Each of the double pinion idlers F comprises a large gear section $F_1$ of the same pitch diameter as the gear section $E_2$, and a small gear section $F_2$ which is integrally formed with the gear section $F_1$, the pitch diameter of the gear section $F_2$ being smaller than that of the gear section $F_1$. The three double pinion idlers F are drivingly connected with the sleeve gear E through the gear sections $F_1$ which are in constant mesh with the gear section $E_2$, and since the idlers F are spaced 120 degrees apart, as shown in Fig. 9, these idlers also function to floatingly support the sleeve gear E at its right end on the carrier 64 for rotation about the axis of rotation of the spider Z.

A sleeve gear G, which for purposes of definition will be referred to as a counter gear element, extends axially of the half shaft X and surrounds a portion of the latter at the right end of the sleeve gear E, the sleeve gear G having an axial bore of somewhat larger diameter than the portion of the shaft X extending therethrough. The sleeve gear G, like the sleeve gear E is floatingly supported for rotation relative to the half shaft X about the axis of rotation of the spider Z, and the sleeve gears E and G are rotatable relative to each other about said axis. A gear section $G_1$ of larger pitch diameter than the gear sections $E_2$ and $F_2$ is formed on the sleeve gear G at the left end of the latter, and the gear section $G_1$ permanently meshes with the small diameter gear sections $F_2$ of the three double pinion idlers F. The sleeve gear G is thus drivingly connected with the double pinion idlers F, and it is also floatingly supported, at its left end, through the idlers F on the bearing carrier 64 for rotation about the axis of rotation of the spider Z. The base portion of the bearing carrier 64 has a central aperture through which the sleeve gear G extends into the axle housing 34, the aperture in the base portion of the bearing carrier 64 being circular and of relatively large diameter, and its edge presenting a cylindrical surface axially of the shaft X at a substantial radial distance from the surface of the latter. A gear section $G_2$ of smaller pitch diameter than the gear section $G_1$ is formed on the sleeve gear G at the right end of the latter, and forms a counter gear of a planetary gear mechanism which is mounted within the axle housing 34.

The planetary gear mechanism within the axle housing 34 comprises a spider Y which is supported for rotation about the half shaft X in a ball bearing 92 and in a bearing bushing 93 which is fitted into the mentioned circular opening of the base portion of bearing carrier 64. The outer race of the ball bearing 92 is mounted on an internal flange 94 of the axle housing 34, and the inner race of the ball bearing 92 is fitted upon a sleeve portion of the spider Y at the right end of the latter, the half shaft X extending through said sleeve portion of the planet spider Y and being rotatable relative to the latter. A short sleeve portion of relatively large diameter at the left end of the spider Y is rotatably fitted into the bushing 93, and said short sleeve portion is connected by three arms 96 (Fig. 10) with the large end of a conical portion surrounding the shaft X at the left side of the ball bearing 92. Mounted on the spider Y in the circumferential spaces between the arms 96 are three double pinions H, as shown in Fig. 10, one of these pinions appearing in Fig. 2 which shows the planet spider Y in section on line II—II of Fig. 10. The pinion H shown in Fig. 2 is rotatably mounted on a shaft 97 which is supported at its opposite ends in fixed position on the spider Y, and the other pinions H shown in Fig. 10 are similarly mounted on the spider Y for rotation about corresponding shafts 97. Each of the pinions H comprises a gear section $H_1$ in constant mesh with and of smaller pitch diameter than the gear section $G_2$ of the sleeve gear G, and a second gear section $H_2$ which has a larger pitch diameter than the gear section $H_1$, and is integrally formed with the gear section $H_1$. The planet pinions H are thus drivingly connected with the sleeve gear G through the gear sections $H_1$ and $G_2$, and the sleeve gear G is floatingly supported at its right end on the planet pinions H for rotation relative to the planet spider Y and relative to the half shaft X about the axis of rotation of the differential spider Z.

A sun gear K is mounted on the half shaft X for rotation in unison therewith, the gear K having internal splines matching with external splines 98 on the half shaft X. The sun gear K has a smaller pitch diameter than the gear section $G_2$ and the same pitch diameter as the gear section $H_2$. Each of the gear sections $H_2$ of the planet pinions H permanently meshes with the sun gear K, the points of mesh between the sun gear K and the gear sections $H_2$ being spaced 120 degrees apart as will be apparent from an inspection of Fig. 10.

A bevel ring gear 99 for transmitting rotation to the planet spider Y is secured to the latter by a circumferential series of bolts 101, and a mechanism for transmitting power from the power take-off shaft 22 to the bevel ring gear 99 is mounted on the axle housing 34 at the rear side of the latter, as shown in Figs. 2 and 3. Part of said mechanism for transmitting power to the ring gear 99 is enclosed in a rearward enlargement 102 of the axle housing 34, and another part of said mechanism is enclosed in a housing 103 which is secured to the housing enlargement 102, as best shown in Fig. 3. The housing 103 is of generally circular shape, as shown in Fig. 5, and it has a vertical front wall, as shown in Fig. 3, abutting a vertical rear wall of the housing enlargement 102. Bolts 104, one of which is shown in Fig. 3, extend through the front wall of the housing 103 and are screwed into the rear wall of the housing enlargement 102 to secure the housing 103 in fixed position on the axle housing 34. A cover 106 for the open rear end of the housing 103 is secured to the latter by a circumferential series of bolts 107, and the cover 106 has a central bearing hub in which the forward end of the power take-off shaft 22 is rotatably supported by means of a pair of ball bearings 108 and 109. A seal carrier 111 surrounding the shaft 22 is bolted to the cover 106 at the outer side of the latter.

Mounted on the housing enlargement 102 and in axial alignment with the power take-off shaft 22 is a quill shaft 112 which is geared to the bevel ring gear 99 of the planet spider Y by means of a bevel pinion 113, said pinion being integrally formed with the quill shaft 112 at the forward end of the latter and in constant mesh with the ring gear 99. The quill shaft 112 is rotatably supported in axially fixed position on the housing enlargement 102 by means of a roller bearing 114 and by means of a ball bearing 116.

A reversing clutch mechanism is mounted within the housing 103 for transmitting power from the power take-off shaft 22 to the quill shaft 112 selectively in one direction or the other, and said reversing clutch mechanism is constructed as follows. A driving hub 117 extending radially of the power take-off shaft 22 is suitably connected with and supported by the latter forwardly of the ball bearing 109 so that the hub 117 will rotate in unison with the power take-off shaft 22 whenever the latter is rotated by the motor 7 through the power take-off gear train 19, 21, 23 (Fig. 1). The motor 7, being an internal combustion engine, affords a unidirectional drive, and the direction in which the power take-off shaft 22 and the driving hub 117 rotate when the motor 7 is running and the master clutch in the housing 11 is engaged, is indicated by the arrow 118 in Fig. 3. An outer clutch drum 119 is connected in driven relation with the hub 117 at the outer periphery of the latter, and the drum 119 forms a common driving member for two clutches of the multiple disk type and which are indicated generally by the reference characters 121 and 122. The clutch 121 serves to transmit power from the driving drum 119 directly to the quill shaft 112, and the clutch 122 serves to transmit power from the driving drum 119 to the quill shaft 112 through a reverse gear mechanism comprising bevel gears 123, 124 and 126.

The bevel gear 123 is mounted on the rear end of the quill shaft 112 and has a splined connection therewith which secures the bevel gear 123 against rotation relative to the quill shaft 112. An inner drum 127 of the clutch 121 is bolted to the bevel gear 123, and alternate driving and driven clutch disks of the clutch 121 are interposed between the outer drum 119 and the inner drum 127, the driving clutch disks being interlocked at their outer peripheries with the drum 119, and the driven clutch disks being interlocked at their inner peripheries with the drum 127, as usual in multiple disk clutches. The bevel gear 126 is rotatably mounted, by means of a ball bearing 128, on the power take-off shaft 22 at the forward end of the latter, and an inner drum 129 of the clutch 122 is bolted to the bevel gear 126. Alternate driving and driven clutch disks of the clutch 122 are operatively interposed between the drums 119 and 129, the clutch 122 in this respect being similar to the clutch 121.

The bevel gears 123 and 126 are in constant mesh with two bevel pinions 124 which are rotatably mounted on a stationary support comprising a shaft 131 which extends through the quill shaft 112, and a journal head 132 at the rear end of the shaft 131. Referring to Fig. 7, a segmental flange portion 133 is integrally formed with the shaft 131 at the forward end of the latter, and the flange portion 133 has three holes 134 for the reception of mounting bolts 136 (Fig. 3) by means of which the flange portion 133 is secured to the internal flange 94 of the axle housing 34. The journal head 132 is splined on the shaft 131 at the rear end of the latter and has two diametrically opposed journals on which the bevel pinions 124 are rotatably mounted, as shown in Fig. 3.

The clutches 121 and 122 are operable in such a manner that both of them may normally be disengaged, and so that a driving connection between the power take-off shaft 22 and the quill shaft 112 may be established either through the clutch 121 or through the clutch 122, if and when desired. For that purpose a thrust collar 137 is mounted within the drum 119 between the stack of clutch disks of the clutch 121 and the stack of clutch disks of the clutch 122, the thrust collar 137 being axially slidable within the drum 119. Shift rails 138 for the thrust collar 137 are hooked at their forward ends into the thrust collar 137 and extend axially of the drum 119 beyond the rear end of the latter, the clutch disks of the clutch 122 being suitably recessed to provide passages for the shift rails 138 and to permit axial movement of the shift rails 138 relative to said disks and relative to the drum 119. Actuating arms 139 for the shift rails 138 are pivotally mounted on the driving hub 117, the latter having mounting lugs 141 on which the arms 139 are swingably mounted intermediate their ends by pivot pins 142. Ball heads at the outer ends of the actuating arms 139 are received in apertures of the shift rails 138, and a shift collar 143 has a circumferential groove for the reception of ball heads at the inner ends of the actuating arms 139. The shift collar 143 is mounted for axial shifting movement on the central hub portion of the cover 106, and a thrust flange 144 of the collar 143 is embraced by a thrust ring 146 which carries diametrically opposed journals 147, the thrust ring 146 being rotatably fitted upon the flange 144. Referring to Fig. 5, a shift yoke 148 for moving the thrust ring 146 and the shift collar 143 axially back and forth is rockably mounted within the housing 103 by means of aligned shafts 149 and 151. The shaft 149 is mounted in a boss of the housing 103 and provides a pivotal support for the shift yoke 148 at one end of the latter, and the shaft 151 is rotatably mounted in another boss of the housing 103, a portion of the shaft 151 within the housing 103 being non-rotatably fitted into a broached hole of the shift yoke 148, and another portion of the shaft 151 projecting outwardly from the housing 103. The shaft 151 is suitably secured against axial displacement relative to the housing 103, and an actuating lever 152 is mounted on the outwardly projecting portion of the shaft 151, as shown in Figs. 4 and 5, the lever 152 being non-rotatably secured to the shaft 151, as by means of a pin 153. As shown in Fig. 5, the shift yoke 148 is arched to clear the thrust ring 146, and it has two pairs of depending prongs 154 (Fig. 3) at its opposite ends, for cooperation with the journals 147 of the thrust ring 146, one pair of the prongs 154 straddling the journal 147 at one side of the thrust ring 146, and the other pair of prongs 154 straddling the journal 147 at the other side of the thrust ring 146.

Fig. 5 shows the actuating lever 152 in a vertical position, and the prongs 154 of the shift yoke 148 cooperate with the journals 147 of the thrust ring 146 so as to retain the thrust ring 146 and the shift collar 143 in the position in which these parts are shown in Fig. 3, when the actuating lever 152 is in the vertical position in which it is shown in Fig. 4. The shift collar 143, the actuating arms 139, the shift rails 138 and the thrust collar 137 are so interrelated that no axial pressure will be exerted by the thrust collar 137 upon the stack of clutch disks of the clutch 121, and that the thrust collar 137 will likewise exert no axial pressure upon the stack of clutch disks of the clutch 122, when the parts are positioned as shown in Fig. 3. As a result, there will be no driving connection between the power take-off shaft 22 and the quill shaft 112, either through the clutch 121 or through the clutch 122, when the actuating lever 152 is in the vertical position in which it is shown in Fig. 4. In other words, Fig. 4 shows the actuating lever 152 in a neutral position, and while the lever 152 is in said neutral position both of the clutches 121, 122 are disengaged, and the power take-off shaft 22 may be continuously rotated by the motor 7 without imparting rotation to the quill shaft 112.

In order to engage the clutch 121, the actuating lever 152 is swung forwardly from its neutral position, that is, in the direction of arrow L in Fig. 4. Such forward swinging movement of the lever 152 causes rearward shifting movement of the thrust ring 146 and of the shift collar 143, and said rearward shifting movement of the shift collar 143 is transmitted through the arms 139 and shift rails 138 to the thrust collar 137, with the result that the latter will be moved forwardly against the stack of disks of the clutch 121. An abutment plate 156 for disks of the clutch 121 is secured to the drum 119 at the forward end of the latter, and the stack of clutch disks of the clutch 121 will be compressed between the abutment plate 156 and the thrust collar 137 upon forward movement of the latter in response to forward swinging movement of the actuating lever 152 from its neutral position. By applying a gradually increasing pressure upon the actuating lever 152 in the direction of arrow L (Fig. 4) an operator may thus gradually engage the clutch 121, and by gradually releasing such pressure he may gradually disengage the clutch. When the clutch 121 is engaged it will transmit power from the power take-off shaft 22 to the quill shaft 112, and the latter will rotate in the same direction as the power take-off shaft, that is, in the direction of arrow 118 shown in Fig. 3. Such rotation of the quill shaft 112 is transmitted to the compensating gearing A, A₁, B and C of the differential through the auxiliary gearing which has been described hereinabove, and causes steering of the tractor to the left, as will be more fully discussed hereinbelow.

When the clutch 121 is engaged and the power take-off shaft 22 and the quill shaft 112 rotate in the direction of arrow 118 (Fig. 3), the reverse gearing comprising the bevel gears 123, 124 and 126 runs idle, and the inner drum 129 of the clutch 122 rotates in a direction opposite to that of the power take-off shaft 22, such opposite rotation of the drum 129 being accommodated by the clutch 122 which is disengaged while the clutch 121 is engaged.

In order to engage the clutch 122, the actuating lever 152 is swung rearwardly from its neutral position, that is, in the direction of arrow R in Fig. 4. Such rearward swinging movement of the lever 152 causes forward shifting movement of the thrust ring 146 and of the shift collar 143, and said forward shifting movement of the shift collar 143 is transmitted through the arms 139 and shift rails 138 to the thrust collar 137, with the result that the stack of disks of the clutch 122 is compressed between the hub 117 and the thrust collar 137. Like the clutch 121, the clutch 122 may thus be gradually engaged and disengaged by manipulation of the actuating lever 152. When the clutch 122 is engaged it will transmit power from the power take-off shaft 22 to the quill shaft 112 through the reverse gearing 123, 124 and 126, and the quill shaft 112 may thus be rotated in a direction opposite to that indicated by the arrow 118 in Fig. 3, while the power take-off shaft 22 rotates in the direction of said arrow. Such reverse rotation of the quill shaft 112 has the opposite effect than its rotation in the direction of arrow 118, that is, it causes steering of the tractor to the right, as will be discussed more fully hereinbelow. Reverse rotation of the quill shaft 112 upon engagement of the clutch 122 is accommodated by the clutch 121, the latter clutch being disengaged while the clutch 121 is engaged.

Fig. 6 shows an auxiliary brake which is enclosed in the housing enlargement 102 of the axle housing 34 and is associated with the quill shaft 112 for locking said shaft against rotation while both clutches 121, 122 are disengaged, the auxiliary brake being controlled by the clutch actuating lever 152 to automatically release the quill shaft 112 for rotation whenever one or the other of the clutches 121, 122 is engaged. As shown in Fig. 3, a brake drum 157 is mounted on the quill shaft 112 between the roller bearing 114 and the ball bearing 116, the brake drum 157 being secured on the quill shaft against rotary displacement relative thereto. Peripherally arranged about the brake drum 157 is a brake band 158 which is connected with and supported by cam sleeves 159 and 161, said cam sleeves in turn being supported on a rock shaft 162 which extends transversely of the quill shaft 112 above the brake drum 157 and is mounted on the housing enlargement 102, as shown in Fig. 6. A coil spring 163 surrounding the rock shaft 162 within the housing enlargement 102 bears at one end against the cam sleeve 159, and at its other end the coil spring 163 bears against an axially adjustable abutment on the shaft 163, a nut 164 being threaded upon the shaft and a washer being interposed between the nut 164 and the coil spring 163 to provide the axially adjustable abutment. Another coil spring 166, similar to the coil spring 163, bears at one end against the cam sleeve 161 and at its other end against a washer backed by a nut 167 which is threaded upon the shaft 162 to provide an adjustable abutment for the coil spring 166. The cam sleeves 159 and 161 are axially slidable on the shaft 162, and the coil springs 163, 166 normally function to draw the brake band 158 tightly upon the brake drum 157, the springs being compressed between the nuts 164, 167 and the cam sleeves 159 and 161, respectively, to exert considerable pressure upon the latter in opposite directions so as to draw the brake band 158 firmly against the brake drum 157. As a result, any tendency of the quill shaft 112 to rotate while the clutches 121 and 122 are disengaged will be effectively resisted by the described auxiliary brake mechanism comprising the drum 157 and the brake band 158.

A cam collar 168 for releasing the auxiliary brake, as shown in Fig. 6, is mounted on the rock shaft 162 between the cam sleeves 159 and 161. The cam collar 168 is slidable axially on the shaft 162 but is secured against rotation relative thereto by a pin 169 which is fixed on the shaft 162 and extends through diametrically opposed slotted openings of the cam collar 168. Cam surfaces at opposite ends of the cam collar 168 are adapted to cooperate with adjacent cam surfaces of the cam sleeves 159 and 161, respectively, to force the cam sleeves apart against the pressure of the coil springs 163 and 166 when the rock shaft 162 is rotated in one direction or the other from the position in which it is shown in Fig. 6. A rock arm 171 is mounted on the shaft 162 outside of the housing enlargement 102, and the rock arm 171 and the shaft 162 are secured against relative rotary displacement, as by means of a pin 172.

Referring to Fig. 4, a connecting link 173 is pivoted at one end to the free end of the rock arm 171 by a pin 174, and the other end of the link 173 is pivoted to the clutch actuating arm 152 by a pin 176. The angular position of the rock arm 171 on the rock shaft 162 is such that the arm 171 extends straight upwardly, as shown in Fig. 4, when the cam collar 168 and the cam sleeves 159, 161 are positioned as shown in Fig. 6. In other words, Fig. 4 shows the rock arm 171 in brake-applied position, and from that position the rock arm 171 will be swung forwardly, through the link 173, to release the auxiliary brake, when the clutch actuating lever 152 is swung forwardly from its neutral position in the direction of arrow L in order to engage the clutch 121, as has been explained hereinbefore. On the other hand, when the clutch actuating arm 152 is swung rearwardly from its neutral position in the direction of arrow R in order to engage the clutch 122, the rock arm 171 is likewise swung rearwardly from its brake-applied position, and such rearward swinging movement of the rock arm 171 again releases the auxiliary brake, as will be apparent from the foregoing explanations. The auxiliary brake mechanism shown in Fig. 6 will thus be operative to suppress any tendency of the quill shaft 112 to rotate while the clutches 121, 122 are disengaged, and the quill shaft 112 will be automatically released for rotation whenever one or the other of the clutches 121, 122 is engaged. Obviously, this result may be accomplished by means other than the herein disclosed auxiliary brake mechanism, and if desired any other suitable mechanism may be employed for accomplishing said result.

The clutch actuating lever 152 may extend into the operator's cab which is not shown but which is mounted, as stated, on the forward part of the tractor, and the lever 152, may have a handle end in the cab for manipulation by the operator.

As an alternative, a steering wheel or any other suitable control means for the actuating lever 152 may be provided, as will be apparent to those skilled in the art.

In operation, the tractor may be driven on a straight course, in which case both of the clutches 121 and 122 are disengaged, and it may be turned to the left by engagement of the clutch 121, and to the right by engagement of the clutch 122, as has been mentioned hereinbefore. Considering first the operation of the steering mechanism during straight course driving, the following should be noted.

Propelling power for straight course driving is transmitted from the motor 7 through the master clutch 12, 16, torque converter 29 and any selected drive of the change speed transmission 31 to the bevel ring gear 83 of the differential, and assuming that one of the forward speed drives of the change speed transmission has been selected, the differential spider Z will be rotated in the direction of arrow 201 in Fig. 2. Rotation of the differential spider Z in the mentioned direction is transmitted to the half shafts W and X through the compensating gears $A_1$, $A_2$, B and C, and the half-shafts W and X will rotate in unison with each other and with the spider Z in the direction of arrow 201. The track belt drive sprockets 4 and 6, being geared to the half shafts W and X, respectively, through final drive gears 38 and 39, are rotated forwardly when the half shafts W and X rotate in the direction of arrow 201, and the track belts will therefore be driven to move the tractor forward.

During straight ahead drive the planet pinions $A_1$, $A_2$ are carried around in unison with the differential spider Z in the direction of arrow 201, and the spur gears D are likewise carried around in unison with the spider Z without rotating relative to the latter. Consequently, during straight course driving, the sleeve E also rotates in unison with the differential spider Z. The sleeve E is drivingly connected with the planet pinion H of the planetary gearing in the axle housing 34 through the gear train $E_2$, $F_1$, $F_2$, $G_1$, $G_2$, and $H_1$, and this gear train functions, when the sleeve E rotates in unison with the spider Z, and the spider Y is locked against rotation to subject the planet pinion H to rotation about its shaft on the spider Y in the direction of arrow 202, that is, in a direction which is opposite to that in which the spider Z, half shaft X and sleeve E rotate. It will be noted that the double pinion idler F, which is mounted on the bearing carrier 64, transmits rotation of the sleeve E to the sleeve G and causes the latter to rotate in the same direction as the half shaft X, and that the intermeshing gears $G_2$, $H_1$ reverse the direction of rotation of the planet pinion H relative to the sleeve G.

Designating the speed of the sleeve E as $S_E$, and the speed of the pinion H as $S_H$ the relation between these speeds is:

$$\frac{S_H}{S_E} = \frac{e_2}{f_1} \times \frac{f_2}{g_1} \times \frac{g_2}{h_1} \quad (1)$$

wherein $e_2$, $f_1$, $f_2$, $g_1$, $g_2$, and $h_1$ designate the numbers of teeth on the gears $E_2$, $F_1$, $F_2$, $G_1$, $G_2$, and $H_1$, respectively.

In the mechanism as shown the gears $E_2$, and $F_1$ have the same number of teeth, that is, $$e_2 = f_1 \quad (2)$$

and the ratio of each of the gear pairs $F_2$, $G_1$ and $H_1$, $G_2$ is 2:3; that is, $$\frac{f_2}{g_1} = \frac{h_1}{g_2} < 1 \quad (3)$$

Under the conditions expressed by Equations 2 and 3, it follows from Equation 1 that $$S_H = S_E \quad (4)$$

Further, in the mechanism as shown, the number of teeth $k$ on the gear K is equal to the number of teeth $h_2$ on the gear $H_2$ of the planet pinion H, that is, $$k = h_2 \quad (5)$$

From Equations 4 and 5 it follows that when the tractor is driven on a straight course either forward or backward, the planet pinion H will rotate about its shaft on the spider Y in a direction opposite to the direction in which the differential spider Z rotates and at the same speed as the latter; and, as a result, the planet spider Y and the quill shaft 112 will remain at rest when the tractor is driven on a straight course either forward or backward.

It will further be noted that in view of the condition expressed by Equations 3 and 5 hereinabove, the sleeve G rotates at a different speed than the half shaft X when the tractor is driven on a straight course either forward or backward, the sleeve G in the mechanism as shown rotating at only two thirds of the speed of the half shaft X but in the same direction as the latter.

The steering gear train D, $E_1$, $E_2$, $F_1$, $F_2$, $G_1$, $G_2$, $H_1$, $H_2$, and K functions, as has been explained hereinbefore, in such a manner that the planet spider Y remains stationary while the tractor is driven on a straight course either forward or backward, and the principal condition for obtaining this result is that the part of said steering gear train which connects the sleeve E with the half shaft X has a ratio $R_{EX}$ equal to unity, that is:

$$R_{EX} = \frac{e_2}{f_1} \times \frac{f_2}{g_1} \times \frac{g_2}{h_1} \times \frac{h_2}{k} = 1 \qquad (6)$$

The operativeness of the mechanism for steering purposes, as will appear hereinbelow, further depends on the condition that the ratio $P_{GX}$ of the gear train $G_2$, $H_1$, $H_2$ and K of the planetary gearing be other than unity, that is $$P_{GX} = \frac{k}{h_2} \times \frac{h_1}{g_2} > \text{ or } < 1 \qquad (7)$$

Obviously, the mechanism as shown in the drawings could be modified in numerous ways and still meet the basic conditions expressed by Equations 6 and 7.

During straight ahead drive the differential pinions $A_1$ and $A_2$ are carried around, as stated, in unison with the differential spider Z, and the planet spider Y is at rest. Should the tractor develop a tendency to deviate from a straight course, the half shafts W and X would become subject to relative rotation, and as a result, the pinions $A_1$ and $A_2$ would tend to rotate in their bearings relative to the spider Z. Such tendency of the pinions $A_1$, $A_2$ to rotate relative to the spider Z, in turn, creates a tendency of the planet spider Y to rotate in its bearings 92 and 93, because the pinions $A_1$ are permanently geared to the planet pinions H through the gears D, $E_1$, $E_2$, $F_1$, $F_2$, $G_1$, $G_2$ and $H_1$, and the planet pinions H, in turn, are permanently geared to the half shaft X through the gears $H_2$ and K. The planet spider Y is permanently geared to the quill shaft 112 through the bevel ring gear 99 and the bevel pinion 113, and any torque to which the planet spider Y may become subjected by a tendency of the pinions $A_1$, $A_2$ to rotate relative to the differential spider Z will, therefore, be transmitted to the quill shaft 112. The auxiliary brake 157, 158 is operative when the clutches 121, 122 are disengaged, that is, during straight course driving, to strongly resist rotation of the quill shaft 112, and as a result the planet spider Y is, in effect, locked against rotation during straight course driving. It will therefore be seen that when the tractor tends to deviate from a straight course, such tendency will be effectively suppressed due to the fact that the differential pinions $A_1$ and $A_2$ are practically unable to rotate relative to the spider Z when the auxiliary brake 157, 158 is applied. The inability of the pinions $A_1$, $A_2$ to rotate relative to the spider Z, which is caused by application of the auxiliary brake 157, 158, places the differential into a locked condition, and this locked condition of the differential prevails as long as the clutches 121 and 122 are disengaged. The provision of a locked differential is not only desirable for holding the tractor on a straight course, but it is also desirable in other respects. For instance, if one of the track belts should lose traction, as by running into muddy ground, while the other track belt has a firm footing, an unlocked differential would permit spinning of the track belt which has lost traction, and the tractor may become stalled, but with a locked differential this difficulty will be avoided. Or, if a heavily loaded trailer should be hitched to the tractor at the drawbar 41, push of the trailer on a downhill grade may tend to veer the tractor to one side on the other, but when the differential is locked the tractor will effectively resist such veering.

Considering now the operation of the steering mechanism, which causes turning of the tractor to the right or left, the following should be noted. In order to make a pivot turn, the change speed transmission 31 is placed in neutral, and for purposes of explanation it may be assumed that the service brake 84, 88 is applied so as to lock the differential spider Z against rotation in its bearings 69 and 72. Since the transmission 31 is in neutral, no propelling power will be transmitted to the differential spider Z and compensating gearing $A_1$, $A_2$, B, C, when the tractor motor 7 is running and the master clutch 12, 16 is engaged. However, the power take-off shaft 22 will be driven at a speed proportional to the motor speed through the power take-off gears 19, 21, 23, and in the direction of arrow 118 in Fig. 2. Assuming now that the operator engages the clutch 121 by forward movement of the actuating lever 152, it will be apparent that power will then be transmitted from the power take-off shaft 22 to the quill shaft 112, and the latter shaft will be rotated in the direction of arrow 118, the auxiliary brake 157, 158 being released by the mentioned forward movement of the actuating lever 152, as has been explained hereinbefore. As a result of the rotation of the quill shaft 112 in the direction of arrow 118, the planet spider Y will be rotated in its bearings 92, 93 in the direction of the arrow 200 in Fig. 2. Rotation of the planet spider Y in the direction of arrow 200, while the differential spider Z is locked against rotation, causes rotation of the half shafts W and X at equal speeds in opposite directions, the direction in which the half-shaft W turns during said rotation of the spider Y being indicated in Fig. 2 by the arrow 203, and the direction in which the half-shaft X turns during said rotation of the spider Y being indicated in Fig. 2 by the arrow 204. The functional relation between the planet spider Y and the half-shafts W and X, and the stated relation between the direction of rotation of the spider Y and the directions of rotation of the half-shafts W and X will be more fully apparent from the following considerations.

Assuming first, as usual in the analysis of planetary gearing, that the sun gear K be held stationary, the ratio between gear sleeve G and spider Y is $$R_{GY} = 1 - \frac{h_1 k}{(-g_2)(-h_2)} \qquad (8)$$

Assuming next that the gear sleeve G be held stationary, the ratio between the sun gear K and the spider Y is $$R_{KY} = 1 - \frac{g_2 h_2}{(-h_1)(-k)} \qquad (9)$$

The gear sleeve G is permanently geared to the half-shaft X through the fixed ratio gear train $G_1, F_2, F_1, E_2, E_1, D, A_1, A_2, C$, and the fixed ratio of said gear train is $$R_{XG} = \frac{g_1}{-f_2} \times \frac{f_1}{-e_2} \times \frac{e_1}{-d} \times \frac{a_1}{-a_2} \times \frac{a_2}{-c} \quad (10)$$

In the above Equations 8, 9 and 10 the small letters designate the tooth numbers of the respective gears, and a minus sign is used in the denominators to record the reversals of rotation which occur at the several gear contacts.

Assuming gear K to be loose on shaft X and held stationary, while spider Y is rotated through one full revolution in the direction of arrow 200, the resulting number of revolutions $N_x$ of the half-shaft X in the direction of arrow 204, as determined by Equations 8 and 10, will be $$N_x = \left(1 - \frac{h_1 k}{(-g_2)(-h_2)}\right) R_{XG} \quad (11)$$

Equation 11 denotes the corrective rotation which must be imparted to the hypothetically loose gear K in the direction of arrow 204, while the shaft X and the gear sleeve G are held stationary, in order to reestablish the actual angular relation between the gear K and the half shaft X. Such corrective rotation of the gear K causes rotation of the spider Y in the direction of arrow 200, and it imparts to the spider Y a number of corrective rotations $N_{Yc}$ which are determined by Equations 9 and 11 as follows:

$$N_{Yc} = \frac{\left(1 - \frac{h_1 k}{(-g_2)(-h_2)}\right) R_{XG}}{1 - \frac{g_2 h_2}{(-h_1)(-k)}} \quad (12)$$

The number of corrective rotations $N_{Yc}$ as expressed by Equation 12 must be added to the mentioned one full revolution of the spider Y, in order to obtain the total number of revolutions $N_{Yt}$ of the spider Y, which are required to produce the number of turns $N_x$ of the half-shaft X as expressed by Equation 11. That is, $$N_{Yt} = 1 + \frac{\left(1 - \frac{h_1 k}{(-g_2)(-h_2)}\right) R_{XG}}{1 - \frac{g_2 h_2}{(-h_1)(-k)}} \quad (13)$$

From Equations 11 and 13 it follows that the gear ratio $R_{YX}$ between the planet spider Y and the half-shaft X is $$R_{YX} = \frac{1}{\left(1 - \frac{h_1 k}{(-g_2)(-h_2)}\right) R_{XG}} + \frac{1}{1 - \frac{g_2 h_2}{(-h_1)(-k)}} \quad (14)$$

As a practical example, the various gears of the differential and planetary gear mechanisms and of the intervening gears, as shown in Fig. 2, may be assumed to have the following numbers of teeth:

$a_1 = 12$     $f_1 = 24$
$a_2 = 12$     $f_2 = 16$
$b = 33$     $g_1 = 24$
$c = 33$     $g_2 = 21$
$d = 24$     $h_1 = 14$
$e_1 = 21$     $h_2 = 21$
$e_2 = 24$     $k = 21$

Calculating on the basis of these tooth numbers, it will be found that $$R_{GY} = \tfrac{1}{3};\ R_{KY} = -\tfrac{1}{2};\ R_{XG} = -\frac{21}{44}$$

and $$R_{YX} = \frac{1}{\tfrac{1}{3} \times \left(-\tfrac{21}{44}\right)} + \frac{1}{-\tfrac{1}{2}} = -\frac{58}{7}$$

This means that when the spider Y is rotated while the spider Z is held stationary, 58 full revolutions of the spider Y in one direction will cause 7 full revolutions of the half-shaft X in the opposite direction.

The half-shaft X is drivingly connected with the right track belt drive sprocket 6 (Fig. 1) through final drive gears 38, 39, and the half-shaft W is similarly connected with the left track belt drive sprocket 4, as has been explained hereinabove. Accordingly, when the steering mechanism is operated in the manner described hereinbefore, that is, when the tractor motor 7 is running and power is transmitted to the quill shaft 112 through the engaged clutch 121, while the change speed transmission 31 is in neutral and the differential spider Z is locked by the service brake 84, 88, the right track belt drive sprocket 6 will be driven forwardly and the left track belt drive sprocket 4 will be driven rearwardly and at the same speed as the track belt drive sprocket 6. As a result, the tractor will execute a pivot turn to the left about its center of gravity. The opposite effect, that is, a pivot turn to the right may be obtained by engagement of the clutch 122, as will be obvious from the foregoing explanations. Engagement of the clutch 122, as mentioned hereinbefore, establishes a reverse driving connection between the power take-off shaft 22 and the quill shaft 112 through the bevel gears 123, 124, 126, and the planet spider Y will therefore be driven in a direction opposite to that indicated by the arrow 200 in Fig. 2, when power is transmitted from the power take-off shaft 22 to the quill shaft 112 through the clutch 122. As a result of such rotation of the planet spider Y the half-shaft X will be rotated in the direction of arrow 200 in Fig. 2, and the half-shaft W will be rotated in the direction of arrow 201, and at the same speed as the half-shaft X, provided that the differential spider Z is stationary.

The motor 7 of the tractor, according to established practice, is equipped with a governor (not shown) which functions to automatically open and close the throttle in accordance with power requirements so that the motor will be kept running as closely as possible to a predetermined speed under varying load conditions. Accordingly, when one or the other of the clutches 121, 122 is engaged while the change speed transmission is in neutral, the power take-off shaft 22 will be driven at a predetermined speed and the engine will deliver the necessary amount of power for turning the tractor about its center of gravity.

The gearing 19, 21, 23 (Fig. 1), which connects the clutch shaft 14 with the power take-off shaft 22 has a fixed over-all ratio and for any given motor speed the angular velocity of the tractor in executing a pivot turn about its center of gravity is determined by said over-all ratio and by the fixed ratio of the gearing which transmits power from the power take-off shaft 22 to the half-shafts W and X for causing relative rotation of the latter and which permits unitary rotation of the half-shafts W and X in either direction. In tractors, the usually desired turning rate for a pivot turn lies between 3½ and 5 complete turns per minute, and the tractor disclosed herein may readily be constructed so that it will turn at a rate between said limits about its center of gravity when one or the other of the clutches 121 and 122 is engaged and while the engine is kept running at or near its mentioned predetermined speed.

The horsepower capacity of the motor 7 is, of course, susbtantially greater than the power required for making a pivot turn under ordinary conditions and if, for any reason, it should be desired to execute a pivot turn at a higher speed than that afforded by the mentioned over-all gear ratios and by the mentioned predetermined motor speed, it is only necessary for the operator to increase the motor speed by means of a suitable throttle control mechanism, not shown. On the other hand, in order to decrease the angular velocity of the tractor during a pivot turn while the motor is running at its predetermined speed, the one of the clutches 121, 122 through which power is transmitted to the spider Y may be partially released.

The change speed transmission which is interposed between the torque converter 29 and the differential gearing of the main drive affords three forward speeds and one reverse speed, as has been explained hereinbefore.

When the tractor is operated with the change speed transmission in lowest gear it will proceed at a relatively low speed, and the governor of the motor will maintain the motor running as closely as possible to the mentioned predetermined speed. Engagement of one or the other of the clutches 121, 122 while the tractor is proceeding in lowest gear will create an additional power demand upon the motor, and if the tractor is pulling no load or only a relatively light load, the motor will supply the required additional power for turning the tractor without appreciable loss of speed. That is, the differential spider Z and the planet spider Y will be rotated simultaneously at predetermined speeds, the speed of the differential spider being determined by the selected lowest gear ratio of the change speed transmission, and the speed of the planet spider Y being the same as that at which the spider Y is rotated during a pivot turn. In other words, an auxiliary drive supplying steering power will be superimposed upon the compensating gearing of the differential which transmits the propelling power, and as a result, the speed of one of the track belts will be increased a predetermined amount, and at the same time the speed of the other track belt will be decreased the same predetermined amount while the tractor continues to move forward at a speed equal to that at which it was traveling prior to engagement of one of the clutches 121, 122. Due to the mentioned unequal speeds of the track belts, however, the tractor will now travel on an arc, and the radius of said arc will be definitely determined by the ratio between the speed at which the output shaft 44 of the change speed transmission rotates and the speed at which the power take-off shaft 22 rotates. For operation of the tractor in low gear this speed ratio between the shafts 44 and 22 is relatively low, and the radius of the arc on which the tractor travels when one or the other of the clutches 121, 122 is fully engaged during low speed drive will be relatively short. Obviously, an increase of the motor speed which the operator might effect by means of the mentioned throttle control mechanism, would merely increase the traveling speed of the tractor but it would not affect the mentioned predetermined turning radius. On the other hand, the operator could increase said radius, if desired, by partially disengaging the one of the clutches 121, 122 through which the quill shaft 112 is driven during the turn.

The hydraulic torque converter 29 which is interposed between the motor 7 and the change speed transmission 31 affects the speed of the input shaft 43 of the change speed transmission under varying load conditions, in that it causes said input shaft to slow down relative to the motor shaft when the power demand upon the motor exceeds the power which the motor is able to furnish at its mentioned predetermined speed. If the tractor is operated under conditions which cause a speed reduction of the transmission input shaft 43 by the hydraulic torque converter, while the motor operates under control of the governor at its predetermined speed and while one of the clutches 121, 122 is engaged, the radius of turn will be shortened, because in that case the ratio of the speeds at which the shafts 44 and 22 rotate will be decreased.

The foregoing considerations with respect to the radius of turn during operation of the tractor in lowest gear similarly apply to operation of the tractor in second and high gear. When the second speed drive of the change speed transmission is established and the motor operates under control of the governor, the latter keeps the motor running at approximately the same speed as during operation of the tractor in low gear, but the tractor will travel at a higher speed. While traveling at such higher speed the tractor may be steered to the right or left by engagement of the clutch 122 or 121, respectively, but the radius of turn in that case will be larger than the aforementioned predetermined radius of turn which is obtained when one or the other of the clutches 121, 122 is engaged while the tractor is operated in lowest gear. The radius of turn, as stated herein before, is definitely determined, upon full engagement of one or the other of the clutches 121, 122, by the ratio between the speeds of the transmission output shaft 44 and the power take-off shaft 22, and that ratio obviously is increased as the change speed transmission is shifted into higher gears. Accordingly, when one or the other of the clutches 121, 122 is fully engaged while the tractor is operated in second gear the resulting predetermined radius of turn will be larger than the aforementioned predetermined radius of turn which is obtained when one or the other of the clutches 121, 122 is fully engaged during lowest speed drive. Likewise, when one or the other of the clutches 121, 122 is fully engaged while the tractor is operated in high gear, the resulting radius of turn will be larger than the radius of turn which is obtained when one or the other of the clutches 121, 122 is fully engaged while the tractor is operated in any of the lower speed gears.

Establishment of the reverse speed drive of the change speed transmission reverses the direction of rotation of the transmission output shaft 44 and of the differential spider Z, but it does not reverse the direction of rotation of the power take-off shaft 22. Accordingly, when one or the other of the clutches 121, 122 is engaged during reverse speed drive for the purpose of steering, the tractor will respond in a way opposite to that in which it responds to engagement of one or the other of the clutches 121, 122 during forward speed drive. That is, engagement of the clutch 121 which during forward speed drive causes the tractor to turn to the left, will, during reverse speed drive, cause the tractor to turn to the right; and engagement of the clutch 122 which during forward speed drive causes the tractor to turn to the right will, during reverse speed drive, cause the tractor to turn to the left.

For convenience, the amount of power which the motor is required to furnish in order to overcome the resistance of the tractor against turning will be referred to as the steering power; and the amount of power which the motor is required to furnish in order to advance the tractor on a straight course will be referred to as the propelling power. For a crawler type tractor of given weight and having a given tread spacing and track belts of given length and width, the required steering power may be determined according to well-known principles, and it has been found that said steering power is the same for any radius of turn, provided that all power expended in negative pull on the inside track can be recovered on the outside track.

The mechanism as disclosed herein satisfies the last mentioned requirement when the tractor executes a pivot turn, and it also satisfies said requirement when the tractor executes a turn in response to full engagement of one or the other of the clutches 121, 122 while propelling power is transmitted to the differential spider Z through any one of the various gear combinations of the change speed transmission. This mode of operation of the mechanism is highly significant from a practical point of view, because it means that when the tractor executes a pivot turn in response to full engagement of one or the other of the clutches 121, 122, the entire power output of the motor will be available for steering power, and when the tractor executes a radius turn in response to full engagement of one or the other of the clutches 121, 122, the entire power output of the engine minus the steering power will be available for propelling power. No brake or clutch friction losses are incurred under these conditions, and none of the engine power is therefore wasted in heat. As a result, a considerable amount of motor power will be saved and be available either for accelerating the tractor or for developing drawbar pull during a turn. Incidentally, the transmission will be subject to less heat and the likelihood of the transmission becoming subject to excessively high temperatures will be greatly reduced.

As stated hereinbefore, the tractor turns on an arc of relatively short radius in response to full engagement of one or the other of the clutches 121, 122 when the change speed transmission is in lowest gear, and the tractor turns on larger radii, respectively, in reponse to full engagement of one or the other of the power take-off clutches, when the transmission is operating in second and high gears. It is not necessary, nor is it desirable, to turn the tractor on a short radius when traveling at high speeds. There is a certain limiting radius below which it might be dangerous to turn at high speed on account of the centrifugal force and the possibility of skidding. The steering mechanism as disclosed herein functions in such a manner that when the transmission is in high gear and the tractor turns in response to full engagement of one or the other of the clutches 121, 122, the resulting turning radius is of such length that the tractor may be driven safely at a relatively high speed, that is, without danger of overturning or skidding during the turn. For instance, in a tractor which is capable of developing a top speed of 30 to 40 miles per hour in high gear, a controlled turning radius for high gear of one hundred feet or more may be provided.

A further advantage of providing an automatically controlled turning radius for each gear ratio of the change speed transmission, as disclosed herein, resides in the fact that the possibility of subjecting the track belts to excessive side thrust during a turn, and the resulting danger of throwing a track, is greatly reduced.

It will further be noted that during a radius turn propelling power is transmitted to the half shafts W and X through the change speed transmission and through the spider Z and compensating gearing $A_1$, $A_2$, B and C of the differential mechanism, and that steering power is transmitted to the compensating gearing of the differential, separately from the propelling power, through the steering gear train comprising the gears 113, 99, K, $H_2$, $H_1$, $G_2$, $G_1$, $F_2$, $F_1$, $E_2$, $E_1$ and D. The main drive comprising the torque converter, change speed transmission and differential must be capable of transmitting the full power output of the motor, but the mentioned steering gear train is ordinarily required to transmit only a fraction of the full power output of the motor and during straight course driving it is not subject to the heavy loadings which are incident to the transmission of propelling power through the main drive. Accordingly, the steering gear train may be and, as shown in Fig. 2, is constructed much lighter than the main drive.

It will further be noted that the steering mechanism as disclosed herein affords a positive driving connection between the engine and the track belts at all times during operation of the tractor. In this respect the mechanism satisfies a requirement which has long been recognized for well-known reasons, but which is not met in tractors which are equipped with conventional steering clutches and brakes and in which steering is effected by interrupting the drive of the inside track and by applying a brake to retard the latter while the outside track is driven by the engine.

When a conventional type tractor is hitched to a heavily loaded trailer, steering difficulties are usually encountered, particularly when a turn is attempted during downhill movement on a grade. In order to execute a turn during such downhill movement by means of steering clutches and brakes it is necessary to interrupt the drive of the outside track, and the pushing force of the trailer constitutes a serious hazard because it unduly increases the turning tendency of the tractor at the moment when the drive of the outside track is interrupted; and unless the operator is extremely careful in manipulating the respective steering clutch and the brakes, the vehicle train may jackknife and turn over. The mechanism as disclosed herein largely eliminates the mentioned steering difficulties and it greatly reduces the danger of jacknifing because the motor remains drivingly connected with both track belts when the tractor is steered to the right or left, and because the radius of turning is definitely controlled, as explained hereinbefore. During any radius turn, the main drive which includes the torque converter, change speed transmission and differential gearing affords a first two-way driving connection between the engine and the track belts, and the auxiliary drive which includes the power take-off gearing and steering gear train affords a second two-way driving connection between the engine and the track belts, and both of these driving connections cooperate, during any radius turn, to control the movement of the track belts. As a result, when the tractor is hitched to a heavily loaded trailer, steering will be greatly facilitated, and particularly during turning on a grade either uphill or downhill. The same considerations apply to a pivot turn, in which case the engine is drivingly connected with both track belts by the auxiliary drive comprising the power take-off gearing and the steering gear train.

It should further be noted that the clutches 121, 122 can be kept relatively small because they only have to handle the steering power which, as stated, is ordinarily much less than the maximum power output of the motor. These clutches, therefore, will be operable with much less manual effort than the conventional steering clutches each of which must be large enough to handle the maximum power output of the tractor motor, and which, at least in the larger size conventional type tractors are hard to operate, as is well known in the art.

Reviewing the herein disclosed motor vehicle propelling and steering mechanism, in general terms, the following should be noted. The output shaft 44 of the change speed transmission represents a rotatable propelling power input element of the mechanism, and the half shafts W and X represent a pair of relatively rotatable power output elements. A differential mechanism which connects the propelling power input element 44 in driving relation with the power output elements W and X includes two relatively rotatable component elements $A_1$ and C which are operative in response to relative rotation thereof to impress a differential drive upon the power output elements W and X. The planet pinions H represent planetary pinion means which are mounted on a spider Y and in mesh with a sun gear K and a counter gear $G_2$ of an auxiliary planetary gear train. The sun gear K, the counter gear G and the planetary pinion means H of the auxiliary planetary gear train are constructed so that the gear ratio between a first element $G_2$ and a second element Y of said planetary gear train at zero speed of the third element K thereof is smaller than unity; this gear ratio being in accordance with Formula 8 hereinbefore.

The bevel pinion 113 and the bevel ring gear 99 represent means independent of the first element $G_2$ and of the third element K of the auxiliary planetary gear train, operatively connecting a steering power input element, as represented by the quill shaft 112, with the second element Y of the auxiliary planetary gear train. Torque transmitting means which include the gear train $G_1$, $F_2$, $F_1$, $E_2$, $E_1$, D and the splines 98 operatively connect the first element $G_2$ and the third element K of the auxiliary planetary gear train with the mentioned relatively rotatable component elements $A_1$ and C, respectively, of the differential mechanism.

The third element K of the auxiliary planetary gear train is operatively connected in nonspeed changing relation with one of the component elements $A_1$ and C of the differential mechanism by torque transmitting means including the splines 98 and other torque transmitting means, independent of the second element Y and of the third element K of the auxiliary planetary gear train, operatively connect the first element $G_2$ of the planetary gear train in speed changing relation with the other of the component elements $A_1$, C of the differential mechanism.

In the illustrated embodiment of the invention, the last mentioned torque transmitting means comprise an auxiliary torque transmitting element as represented by the sleeve gear E which is operatively connected in speed changing relation with the first element $G_2$ of the auxiliary planetary gear train and with the mentioned other component element of the differential mechanism, such other component element in the present instance being represented by the planetary pinion $A_1$.

The gear D represents a gear element which is secured to a planet pinion of the differential mechanism and the gear section $E_1$ represents a rotatable auxiliary pinion in mesh with the gear element D and having a smaller pitch diameter than the latter.

The gear train $G_1$, $F_2$, $F_1$, $E_2$ represents a speed changing mechanism which comprises a drive member represented by the sleeve gear G and connected with the first element $G_2$ of the auxiliary planetary gear train for rotation in unison therewith; a driven member represented by the sleeve gear E and connected with the auxiliary pinion $E_1$ for rotation in unison therewith, and gearing connecting the drive member G in speed changing driving relation with the driven member E. The last mentioned gearing is represented by the gear sections $G_1$, $F_2$, $F_1$, $E_2$, and it is so constructed that it affords a gear ratio between the drive member G and the driven member E equal or substantially equal to the gear ratio which exists between the first element $G_2$ and the third element K of the auxiliary planetary gear train at zero speed of the second element Y of the latter.

Calculating on the basis of the specific tooth numbers which have been mentioned hereinbefore for purposes of exemplification, the gear ratio between the first element $G_2$ of the planetary gear train and the auxiliary pinion $E_1$ is $$R_{G_2}E_1 = \frac{e_2}{f_1} \times \frac{f_2}{g_1} = \frac{24}{24} \times \frac{16}{24} = \frac{2}{3} \quad (15)$$

and the gear ratio which exists between the first element $G_2$ and the third element K of the planetary gear train at zero sped of the second element Y of the latter, is also 2:3, as determined by Equation 7 herinabove.

The first element $G_2$ and the third element K of the auxiliary planetary gear train also represent relatively rotatable output elements of an auxiliary differential mechanism which has a rotatable input element as represented by the spider Y, and planetary gearing operatively interrelated with the input and output elements Y, $G_2$ and K and constructed so as to afford a smaller than unity gear ratio between one of the output elements $G_2$, K and the input element Y at zero speed of the other of said output elements, and another smaller than unity gear ratio between the other of the output elements $G_2$, K and the input element Y at zero speed of said one output element. In the illustrated embodiment of the invention the first of these gear ratios is defined by Formula 8 hereinbefore, and the other is defined by Formula 9 hereinbefore.

The provision of a planetary gear train in which, as stated, the gear ratio between a first and a second element thereof, at zero speed of its third element, is smaller than unity, and the connection of the steering power input element with the second element of the planetary gear train is significant in that it contributes to the accomplishment of the desired object of reducing the torque loads on the steering power transmitting mechanism to a sufficient extent which will make it possible to construct said mechanism substantially lighter than the propelling power transmitting mechanism.

Another feature of the improved propelling and steering mechanism, which may be noted from a general point of view, resides in a relative proportioning of the sun and counter gears of the planetary gear train, so that they have unequal pitch diameters. This provision makes it possible, although not mandatory, to introduce the steering power on the spider of the planetary gear train.

A further feature of the improved propelling and steering mechanism which may be noted from a general point of view resides in the speed changing relation between the gear section $E_1$ and the gears D, which is significant in that it further contributes to a sufficiently high overall reduction ratio of the steering gear train, which permits a substantially lighter construction of the steering power transmitting mechanism than that of the propelling power transmitting mechanism.

It will also be noted that the mechanism includes a reaction gear element which is mounted on the supporting structure for the mechanism independently of the main differential and independently of the spider of the auxiliary planetary gear train, such reaction gear element, in the illustrated embodiment of the invention, being represented by any one of the double pinion idlers F.

In connection with the description of the steering gear train D, $E_1$, $E_2$, $F_1$, $F_2$, $G_1$, $G_2$, $H_1$, $H_2$, K, it has been shown by Equation 6 hereinbefore that during standstill or at zero speed of the spider Y, the gears $E_2$, $F_1$, $F_2$, $G_1$, $G_2$, $H_1$, $H_2$, K afford a gear ratio equal to unity between the sun gear K and the sleeve E. Rotation of the spider Y in order to effect steering, causes relative rotation of the sun gear K and the sleeve E, which means that the gear ratio between the sun gear K and the sleeve E, in that case, is no longer equal to unity, the change of ratio being determined by and proportional to the speed of rotation of the spider Y. Considering the herein disclosed propelling and steering mechanism from this point of view, it will be noted that the invention, in its broader aspects, incorporates an auxiliary planetary gear train which affords a gear ratio smaller than unity between a first and a second element thereof at zero speed of a third element thereof, as has been discussed hereinbefore; a rotatable steering power input element which is operatively connected with said second element of the auxiliary planetary gear train, as has also been discussed hereinbefore; and means comprising said auxiliary planetary gear train, said steering power input element, and a speed changing mechanism operatively connected with one of said first, second and third elements of said planetary gear train, for establishing a variable power transmitting connection between two relatively rotatable elements of a differential mechanism, and for controlling said variable ratio connection so as to permit unitary rotation of said differential mechanism for straight course driving and rotate said elements of the differential mechanism relative to each other for steering. These general definitions apply to the specific embodiment of the invention which has been selected for illustration in the drawings, if the gear section $G_2$, the spider Y and the sun gear K are considered as the mentioned first, second and third elements, respectively, of the auxiliary planetary gear train; if the quill shaft 112 is considered as the steering power input element; if the reduction gearing $E_2$, $F_1$, $F_2$ and $G_1$ is considered as the mentioned speed changing mechanism; and if any one of the main planet pinions $A_1$ and the sun gear C are considered as the mentioned relatively rotatable elements of the differential mechanism.

While in the foregoing a preferred embodiment of the invention has been disclosed, it should be understood that it is not intended to limit the invention to the exact details of construction herein shown and described for various modifications within the scope of the appended claims may occur to persons skilled in the art.

It is claimed and desired to secure by Letters Patent:

1. In a motor vehicle having ground engaging traction devices at opposite sides thereof and a differential mechanism operatively interposed between said traction devices and comprising a pair of driven shafts, a spider, and compensating gearing rotatable relative to said spider, the combination of a support rotatably mounting said spider and said shafts, a planet spider mounted on said support for rotation independently of said differential spider, means operable to rotate said planet spider selectively in opposite directions, a double planet pinion rotatably mounted on said planet spider, a sun gear secured to one of said shafts and in mesh with one section of said planet pinion, a rotatable counter gear sleeve surrounding said one shaft and having a first gear section in mesh with the other section of said planet pinion, an idler rotatably mounted on said support and having a first gear section in mesh with a second gear section of said counter gear sleeve, an auxiliary gear sleeve rotatable relative to said counter gear sleeve about said one shaft and having a gear section in mesh with a second gear section of said idler, and gearing connecting said auxiliary gear sleeve in driving relation with said compensating gearing.

2. A motor vehicle as set forth in claim 1, in which the over-all ratio of the gearing comprising said sun gear, planet pinion, counter gear sleeve, idler and gear section of said auxiliary gear sleeve, is unity, and in which the over-all ratio of the gearing comprising said sun gear, planet pinion and first gear section of said counter gear sleeve is other than unity.

3. A motor vehicle as set forth in claim 1, in which the ratio between said sun gear and said one section of said planet pinion is the same as the ratio between said second gear section of said idler and said gear section of said auxiliary gear sleeve, and in which the ratio of said other section of said planet pinion and said first gear section of said counter gear sleeve is the same as the ratio of said first gear section of said idler and said second section of said counter gear sleeve and different from said ratio of said sun gear and said one section of said planet pinion.

4. A motor vehicle as set forth in claim 1, in which the over-all ratio of the gearing comprising said sun gear, planet pinion, counter gear sleeve, idler and gear section of said auxiliary gear sleeve is unity and in which said sun gear has the same number of teeth as said one section of said planet pinion; and in which said first gear section of said counter gear sleeve has more teeth than said other section of said planet pinion.

5. A power transmitting mechanism comprising a support, a pair of relatively rotatable driving shafts and a pair of relatively rotatable driven shafts mounted on said support, a differential mechanism operatively interposed between said driven shafts and comprising a spider connected in driven relation with one of said driving shafts and compensating gearing rotatable relative to said spider, a planetary gear mechanism comprising a planet spider mounted on said support for rotation about the axis of one of said driven shafts and connected in driven relation with the other of said driving shafts, a sun gear non-rotatably secured to said one driven shaft, a planet pinion on said planet spider in mesh with said sun gear, and a counter gear in mesh with said planet pinion and rotatable coaxially with and relative to said one driven shaft; an idler gear rotatable about a stationary axis on said support and connected in driven relation with said counter gear; and power transmitting means between said idler gear and said compensating gearing of said differential mechanism.

6. A power transmitting mechanism comprising, a support, a pair of relatively rotatable driving shafts and a pair of relatively rotatable driven shafts mounted on said support, a differential mechanism operatively interposed between said driven shafts and comprising a spider connected in driven relation with one of said driving shafts and compensating gearing rotatable relative to said spider, a planetary gear mechanism comprising a planet spider mounted on said support for rotation about the axis of one of said driven shafts and connected in driven relation with the other of said driving shafts, a sun gear non-rotatably secured to said one driven shaft, a planet pinion on said planet spider in mesh with said sun gear, and a counter gear in mesh with said planet pinion and rotatable coaxially with and relative to said one driven shaft; an idler gear rotatable about a stationary axis on said support and connected in driven relation with said counter gear; an auxiliary gear in mesh with said idler gear and rotatable coaxially with and relative to said one driven shaft, and power transmitting means between said auxiliary gear and said compensating gearing of said differential mechanism.

7. A power transmitting mechanism as set forth in claim 6, in which the gearing comprising said sun gear, planet pinion and counter gear affords a gear ratio between said counter and sun gears, at zero speed of said planet spider, smaller than unity, and in which the over-all ratio of the gearing comprising said sun gear, planet pinion, counter gear, idler gear and auxiliary gear is unity.

8. A power transmitting mechanism comprising, a support, a pair of relatively rotatable driving shafts and a pair of relatively rotatable driven shafts mounted on said support, a planetary gear mechanism comprising a planet spider mounted on said support for rotation about the axis of one of said driven shafts and connected in driven relation with one of said driving shafts, a sun gear mounted on said one driven shaft for rotation therewith, a planet pinion on said planet spider in mesh with said sun gear, and a counter gear in mesh with said planet pinion and rotatable coaxially with and relative to said one driven shaft; an idler gear connected in driven relation with said counter gear; an auxiliary gear rotatable coaxially with and about said one driven shaft and in mesh with said idler gear; and a differential mechanism comprising a spider rotatably mounted on said support, and connected in driven relation with the other of said driving shafts, and compensating gearing rotatably mounted on said spider, said compensating gearing including a compensating pinion geared to one of said driven shafts and carrying a gear connected in driven relation with said auxiliary gear, and another compensating pinion in mesh with said first mentioned compensating pinion and geared to the other of said driven shafts.

9. A power transmitting mechanism comprising, a support, a pair of relatively rotatable driving shafts and a pair of relatively rotatable driven shafts mounted on said support, a planetary gear mechanism comprising a planet spider mounted on said support for rotation about the axis of one of said driven shafts and connected in driven relation with one of said driving shafts, a sun gear mounted on said one driven shaft for rotation in unison therewith, a planet pinion on said planet spider in mesh with said sun gear, and a counter gear in mesh with said planet pinion and rotatable coaxially with and relative to said one driven shaft; an idler gear connected in driven relation with said counter gear; an auxiliary gear rotatable coaxially with and about said one driven shaft and in mesh with said idler gear; and a differential mechanism comprising a spider rotatably mounted on said support, and connected in driven relation with the other of said driving shafts, and compensating gearing rotatably mounted on said spider, said compensating gearing including a compensating pinion geared to said one driven shaft mounting said sun gear, and another compensating pinion in mesh with said first mentioned compensating pinion and geared to the other of said driven shafts and to said auxiliary gear.

10. A power transmitting mechanism comprising, a pair of relatively rotatable driven elements, a differential mechanism operatively interposed between said driven elements and comprising a spider and compensating gearing rotatable relative to said spider, a first and a second gear sleeve coaxial with and rotatable relative to one of said driven elements and relative to each other, a central gear non-rotatably connected with said one driven element, first and second auxiliary gears rotatable, respectively, about axes spaced transversely from the axis of said one driven element, said first auxiliary gear meshing with said central gear and with said first gear sleeve, and said second auxiliary gear meshing with said first and second gear sleeves, means operable to move one of said auxiliary gears relative to the other about the axis of said one driven element, and a driving connection between said second gear sleeve and said compensating gearing of said differential mechanism.

11. A power transmitting mechanism comprising, a pair of relatively rotatable driven elements, a differential mechanism operatively interposed between said driven elements and comprising a spider and compensating gearing rotatable relative to said spider, a pair of alternatively engageable clutches having relatively rotatable driven clutch members, respectively, and clutch means for establishing and interrupting driving connections between said driven clutch members and a unidirectionally driven power transmitting element; a first and a second gear sleeve coaxial with and rotatable relative to one of said driven elements and relative to each other, a central gear non-rotatably connected with said one driven element, first and second auxiliary gears rotatable, respectively, about axes spaced transversely from the axis of said one driven element, said first auxiliary gear meshing with said central gear and with said first gear sleeve, and said second auxiliary gear meshing with said first and second gear sleeves, power transmitting means connected in driven relation with said driven clutch members and operable in response to alternate engagement of said clutches to move one of said auxiliary gears relative to the other selectively in opposite directions about the axis of said one driven element, and a driving connection between said second gear sleeve and said compensating gearing.

12. In a motor vehicle propelling and steering mechanism, the combination of a rotatable propelling power input element; a pair of relatively rotatable power output elements, a differential mechanism connecting said propelling power input element in driving relation with said power output elements and including two relatively rotatable component elements which are operative in response to relative rotation thereof to impress a differential drive upon said power output elements; a sun gear, a counter gear and a spider forming relatively rotatable elements, respectively, of an auxiliary planetary gear train; planetary pinion means mounted on said spider and in mesh with said sun and counter gears; said sun gear, counter gear and planetary pinion means being constructed so that the gear ratio between a first and a second of said elements of said planetary gear train, at zero speed of the third of said elements thereof, is smaller than unity; a rotatable steering power input element, means independent of said first and third elements of said planetary gear train operatively connecting said steering power input element with said second element of said planetary gear train; and torque transmitting means operatively connecting said first and third elements of said planetary gear train with said relatively rotatable component elements, respectively, of said differential mechanism.

13. A motor vehicle propelling and steering mechanism as set forth in claim 12, in which said sun and counter gears have unequal pitch diameters.

14. In a motor vehicle propelling and steering mechanism, the combination of a rotatable propelling power input element; a pair of relatively rotatable power output elements, a differential mechanism connecting said propelling power input element in driving relation with said power output elements and including two relatively rotatable component elements which are operative in response to relative rotation thereof to impress a differential drive upon said power output elements; a sun gear, a counter gear and a spider forming relatively rotatable elements, respectively, of an auxiliary planetary gear train; planetary pinion means mounted on said spider and in mesh with said sun and counter gears; said sun gear, counter gear and planetary pinion means being constructed so that the gear ratio between a first and a second of said elements of said planetary gear train, at zero speed of the third of said elements thereof, is smaller than unity; a rotatable steering power input element, means independent of said first and third elements of said planetary gear train operatively connecting said steering power input element with said second element of said planetary gear train; torque transmitting means operatively connecting said third element of said planetary gear train in non-speedchanging relation with one of said component elements of said differential mechanism; and other torque transmitting means independent of said second and third elements of said planetary gear train, operatively connecting said first element of said planetary gear train in speedchanging relation with the other of said component elements of said differential mechanism.

15. A mechanism as set forth in claim 14 in which said other torque transmitting means comprise an auxiliary rotatable torque transmitting element which is operatively connected in speedchanging relation with said first element of said planetary gear train and with said other component element of said differential mechanism.

16. A mechanism as set forth in claim 14, in which said differential mechanism comprises a planet pinion forming one of said component elements thereof and a sun gear forming the other of said component elements and secured to one of said power output elements; and in which said other torque transmitting means comprise a gear element secured to said planet pinion of said differential mechanism, a rotatable auxiliary pinion in mesh with said gear element and having a smaller pitch diameter than the latter, and a speed changing mechanism connecting said auxiliary pinion in torque transmitting relation with said first element of said planetary gear train.

17. A mechanism as set forth in claim 16, in which said speed changing mechanism comprises a drive member connected with said first element of said auxiliary planetary gear train for rotation in unison therewith, a driven member connected with said auxiliary pinion for rotation in unison therewith, and gearing connecting said drive member in speed changing driving relation with said driven member and constructed to afford a gear ratio between said drive and driven members equal or substantially equal to that which exists between said first and third elements of said planetary gear train at zero speed of said second element of the latter.

18. A motor vehicle propelling and steering mechanism comprising, in combination, a support; a propelling power input element and a pair of power output elements rotatably mounted on said support; a differential mechanism connecting said propelling power input element in driving relation with said power output elements and including two relatively rotatable component elements which are operative in response to relative rotation thereof to impress a differential drive upon said power output elements; a sun gear, a counter gear and a spider forming relatively rotatable elements, respectively, of an auxiliary planetary gear train; planetary pinion means mounted on said spider and in mesh with said sun and counter gears; said sun gear, counter gear and planetary pinion means being constructed so that the gear ratio between a first and a second of said elements of said planetary gear train, at zero speed of the third of said elements thereof, is smaller than unity; a rotatable steering power input element, means independent of said first and third elements of said planetary gear train operatively connecting said steering power input element with said second element of said planetary gear train; a reaction gear element mounted on said support independently of said differential mechanism and of said spider of said planetary gear train; an auxiliary torque transmitting element mounted for rotation relative to said reaction gear element and operatively connected with one of said component elements of said differential mechanism; and torque transmitting means including said reaction gear element, operatively connecting said auxiliary torque transmitting element and said first element of said planetary gear train and affording a gear ratio between said first element and said auxiliary torque transmitting element equal to that which exists between said first and third elements of said planetary gear train at zero speed of said second element of the latter; said third element of said planetary gear train being connected in torque transmitting non-speedchanging relation with the other of said component elements of said differential mechanism.

19. In a motor vehicle propelling and steering mechanism, the combination of a rotatable propelling power input element; a pair of relatively rotatable power output elements, a differential mechanism connecting said propelling power input element in driving relation with said power output elements and including two relatively rotatable component elements which are operative in response to relative rotation thereof to impress a differential drive upon said power output elements; a sun gear, a counter gear and a spider forming relatively rotatable elements, respectively, of an auxiliary planetary gear train; planetary pinion means mounted on said spider and in mesh with said sun and counter gears; said sun gear, counter gear and planetary pinion means being constructed so that the gear ratio between a first and a second of said elements of said planetary gear train, at zero speed of the third of said elements thereof, is smaller than unity; a rotatable steering power input element, means independent of said first and third elements of said planetary gear train operatively connecting said steering power input element with said second element of said planetary gear train; and means comprising said auxiliary planetary gear train, said steering power input element, and a speed changing mechanism operatively connected with one of said first, second and third elements of said planetary gear train, for establishing a variable ratio power transmitting connection between said relatively rotatable component elements of said differential mechanism, and for controlling said variable ratio connection so as to permit unitary rotation of said differential mechanism for straight course driving and rotate said component elements of said differential mechanism relative to each other for steering.

20. A mechanism as set forth in claim 19, in which said speed changing mechanism is operatively interposed between one of said first and third elements of said planetary gear train and one of said relatively rotatable component elements of said differential mechanism.

21. A mechanism as set forth in claim 19 in which said speed changing mechanism is operatively interposed between one of said first and third elements of said planetary gear train and one of said relatively rotatable component elements of said differential mechanism, and in which the other of said first and third elements of said planetary gear train is connected in torque transmitting, non-speed changing relation with the other of said component elements of said differential mechanism.

22. A mechanism for driving a pair of relatively rotatable main power transmitting elements selectively in unison or at differential speeds, comprising, relatively rotatable main and auxiliary driving elements, a main differential mechanism connecting said main driving element in driving relation with said main power transmitting elements and including two relatively rotatable component elements which are operative in response to relative rotation thereof to impress a differential drive upon said main power transmitting elements an auxiliary differential mechanism comprising a rotatable input element, a pair of relatively rotatable output elements, and planetary gearing operatively interrelated with said input and output elements and constructed so as to afford a smaller than unity gear ratio between one of said output elements and said input element at zero speed of the other of said output elements and another smaller than unity gear ratio between said other output element and said input element at zero speed of said one output element; means independent of said output elements of said auxiliary differential mechanism connecting said auxiliary driving element in driving relation with said input element of said auxiliary differential mechanism; a speed changing mechanism comprising a drive member connected in non-speedchanging driven relation with said one output element of said auxiliary differential mechanism, a driven member rotatable relative to said drive member, and gearing connecting said drive member in driving relation with said driven member and constructed to afford a gear ratio between said drive and driven members of said speed changing mechanism equal or substantially equal to the gear ratio which exists between said one output element and said other output element of said auxiliary differential mechanism at zero speed of said input element of the latter, torque transmitting means connecting said driven member of said speed changing mechanism with one of said component elements of said main differential mechanism and operative to rotate said driven member of said speed changing mechanism at a predetermined speed upon rotation of said component elements of said main differential mechanism in unison with each other at a predetermined speed, and torque transmitting means connecting said other output element of said auxiliary differential mechanism with said other component element of said main differential mechanism and operative upon said rotation of said component elements in unison with each other, to rotate said other output element at a speed equal or substantially equal to said predetermined speed of said driven member of said speed changing mechanism.

23. A mechanism as set forth in claim 22, in which said main differential mechanism comprises a sun gear forming said other component element thereof and secured to one of said main power transmitting elements for rotation in unison therewith, and in which said other output element of said auxiliary differential mechanism is secured to said one main power transmitting element for rotation in unison therewith.

EMIL F. NORELIUS.

REFERENCES CITED

The following references are of record in the file of this patent:

UNITED STATES PATENTS

| Number | Name | Date |
|---|---|---|
| 1,128,818 | Remy et al. | Feb. 16, 1915 |
| 1,247,725 | Schneider | Nov. 27, 1917 |
| 1,401,221 | White | Dec. 27, 1921 |
| 1,797,797 | Saives | Mar. 24, 1931 |
| 2,196,368 | Thomson | Apr. 9, 1940 |

FOREIGN PATENTS

| Number | Country | Date |
|---|---|---|
| 12,297 | Great Britain | Apr. 24, 1939 |
| 573,528 | Great Britain | Nov. 26, 1945 |